(12) United States Patent
Taninaka et al.

(10) Patent No.: US 9,970,140 B2
(45) Date of Patent: May 15, 2018

(54) NETWORK STRUCTURE HAVING EXCELLENT COMPRESSION DURABILITY

(71) Applicant: TOYOBO CO., LTD., Osaka-shi, Osaka (JP)

(72) Inventors: Teruyuki Taninaka, Otsu (JP); Shinichi Kobuchi, Osaka (JP); Hiroyuki Wakui, Otsu (JP)

(73) Assignee: TOYOBO CO., LTD., Osaka-shi (JP)

(*) Notice: Subject to any disclaimer, the term of this patent is extended or adjusted under 35 U.S.C. 154(b) by 0 days. days.

(21) Appl. No.: 15/026,424

(22) PCT Filed: Sep. 30, 2014

(86) PCT No.: PCT/JP2014/076150
§ 371 (c)(1),
(2) Date: Mar. 31, 2016

(87) PCT Pub. No.: WO2015/050134
PCT Pub. Date: Apr. 9, 2015

(65) Prior Publication Data
US 2016/0237603 A1 Aug. 18, 2016

(30) Foreign Application Priority Data

Oct. 1, 2013 (JP) ................. 2013-206381
Oct. 1, 2013 (JP) ................. 2013-206382
Oct. 1, 2013 (JP) ................. 2013-206383
Oct. 1, 2013 (JP) ................. 2013-206384

(51) Int. Cl.

| | | |
|---|---|---|
| *D04H 3/14* | (2012.01) | |
| *D04H 3/007* | (2012.01) | |
| *D04H 3/009* | (2012.01) | |
| *D04H 3/03* | (2012.01) | |
| *D04H 3/16* | (2006.01) | |
| *A47C 27/12* | (2006.01) | |
| *A47C 7/02* | (2006.01) | |
| *A47D 1/00* | (2006.01) | |
| *A47D 15/00* | (2006.01) | |
| *A47G 9/00* | (2006.01) | |
| *A47G 27/02* | (2006.01) | |
| *B60N 2/70* | (2006.01) | |

(Continued)

(52) U.S. Cl.
CPC ............... *D04H 3/14* (2013.01); *A47C 7/02* (2013.01); *A47C 27/122* (2013.01); *A47D 1/00* (2013.01); *A47D 15/00* (2013.01); *A47G 9/00* (2013.01); *A47G 27/0212* (2013.01); *B60N 2/70* (2013.01); *B60P 7/0823* (2013.01); *B61D 33/0035* (2013.01); *B62J 1/26* (2013.01); *D04H 3/007* (2013.01); *D04H 3/009* (2013.01); *D04H 3/016* (2013.01); *D04H 3/03* (2013.01); *D04H 3/16* (2013.01); *D10B 2321/02* (2013.01); *D10B 2321/08* (2013.01); *D10B 2331/02* (2013.01); *D10B 2331/10* (2013.01)

(58) Field of Classification Search
CPC ............ D04H 3/14; D04H 3/16; D04H 3/016; D04H 3/009; D04H 3/007; D04H 3/03; A47C 7/02; A47C 27/122; Y10T 428/24992; Y10T 442/601; Y10T 428/24; D10B 2321/02; D10B 2331/02; D10B 2331/10; D10B 2401/061; D10B 2401/10; A47G 27/0212
USPC ... 428/220, 218, 311.11, 332, 338, 339, 340
See application file for complete search history.

(56) References Cited

U.S. PATENT DOCUMENTS

| | | |
|---|---|---|
| 5,639,543 A | 6/1997 | Isoda et al. |
| 2002/0041949 A1 | 4/2002 | Nishibori et al. |

(Continued)

FOREIGN PATENT DOCUMENTS

| | | |
|---|---|---|
| EP | 1 832 675 A1 | 9/2007 |
| EP | 2772576 A1 | 9/2014 |

(Continued)

OTHER PUBLICATIONS

International Search Report dated Jan. 13, 2015, issued in counterpart International Application No. PCT/JP2014/076150 (2 pages).

(Continued)

*Primary Examiner* — Joanna Pleszczynska
(74) *Attorney, Agent, or Firm* — Westerman, Hattori, Daniels & Adrian, LLP

(57) ABSTRACT

The present invention provides a network structure having excellent repeated compression durability, a low repeated compression residual strain and a high hardness retention after repeated compression.

A network structure made of a three-dimensional random loop bonded structure obtained by forming random loops with curling treatment of a continuous linear structure including at least one thermoplastic elastic resin selected from the group consisting of a polyolefin-based thermoplastic elastomer, an ethylene-vinyl acetate copolymer, a polyurethane-based thermoplastic elastomer and a polyamide-based thermoplastic elastomer, the continuous linear structure having a fineness of not less than 100 dtex and not more than 60000 dtex, and by making each loop mutually contact in a molten state, wherein The network structure has an apparent density of 0.005 $g/cm^3$ to 0.20 $g/cm^3$, a 50%-constant displacement repeated compression residual strain of not more than 15%, and a 50%-compression hardness retention after 50%-constant displacement repeated compression of not less than 85%.

7 Claims, 1 Drawing Sheet

(51) Int. Cl.
   *B60P 7/08*      (2006.01)
   *B61D 33/00*     (2006.01)
   *B62J 1/26*      (2006.01)
   *D04H 3/016*     (2012.01)

(56) References Cited

U.S. PATENT DOCUMENTS

| | | |
|---|---|---|
| 2008/0146763 A1 | 6/2008 | Yamanaka et al. |
| 2013/0020016 A1* | 1/2013 | Takaoka ................ D04H 3/14 |
| | | 156/166 |
| 2015/0010250 A1 | 1/2015 | Omi |

FOREIGN PATENT DOCUMENTS

| | | |
|---|---|---|
| JP | 7-68061 A | 3/1995 |
| JP | 2001-3257 A | 1/2001 |
| JP | 2002-61059 A | 2/2002 |
| JP | 2004-244740 A | 9/2004 |
| JP | 2006-200118 A | 8/2006 |

OTHER PUBLICATIONS

Extended (Supplementary) European Search Report dated Aug. 5, 2016, issued in counterpart European Patent Application No. 14850151.3. (8 pages).
Office Action dated Mar. 29, 2017, issued in counterpart European Application No. 14850151.3. (5 pages).
Office Action dated Jul. 3, 2017, issued in counterpart European Application No. 14850151.3. (4 pages).

\* cited by examiner

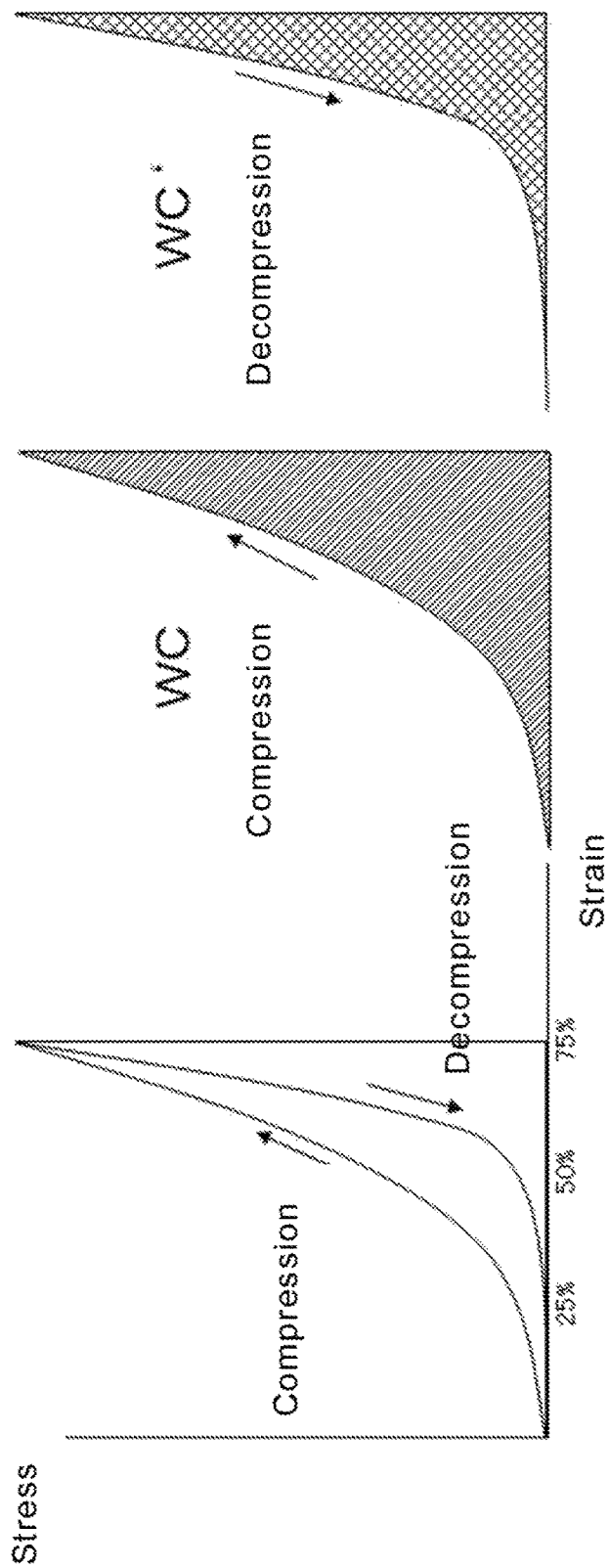

NETWORK STRUCTURE HAVING EXCELLENT COMPRESSION DURABILITY

TECHNICAL FIELD

The present invention relates to a network structure having excellent repeated compression durability which is suitable for cushioning materials that are used for office chairs, furniture, sofas, beddings such as beds, and seats for vehicles such as those for trains, automobiles, two-wheeled vehicles and buggies and child seats; floor mats; and mats for impact absorption such as members for prevention of collision and nipping, etc.

BACKGROUND ART

At present, foamed-crosslinking type urethanes are widely used a cushioning material that is used for furniture, beddings such as beds, and seats for vehicles such as those for trains, automobiles and two-wheeled vehicles.

Although foamed-crosslinking type urethanes have excellent durability as a cushioning material, there is a problem that they easily get stuffy for its inferior moisture-water-permeability and air-permeability, and its thermal storage property. Since the foamed-crosslinking type urethanes do not have thermoplasticity, they have difficulty in recycling, and therefore they give significant damage to incinerators and need high costs in elimination of poisonous gas in case of incineration. For this reason, the foamed-crosslinking type urethanes are often disposed of by landfill, but it also causes problems that the landfill spots is limited because of the difficulty of stabilization of ground and the costs increases. Furthermore, although the foamed-crosslinking type urethanes have excellent workability, they may cause various problems such as pollution problems with chemicals used in the manufacturing process, residual chemicals after foaming and associated offensive odors.

Patent Documents 1 and 2 disclose network structures. They are capable of solving various problems associated with the foamed-crosslinking type urethanes and have excellent cushioning performance. As for the repeated compression durability properties, although those network structures have excellent performance with regard to the repeated compression residual strain with the 20000-time repeated compression residual strain being not more than 20%, they have a low hardness after repeated use with the 50%-compression hardness retention being only about 83% after repeated compression.

Network structures have been heretofore considered to have sufficient durability performance if the repeated compression residual strain is low. In recent years, however, it has been increasingly required to secure cushioning performance after repeated use with compression as requirements for repeated compression durability have become higher. However, in regard to the conventional network structures, it is difficult to obtain a network structure having durability performance which satisfies both the requirements of low repeated compression residual strain and high hardness retention after repeated compression.

Furthermore, as consumer needs in recent years, not only low-repulsion types but also high-repulsion types have been increasingly desired as characteristics of cushioning bodies. Patent Document 3 discloses a method for producing a low-repulsion cushion using a polyolefin-based thermoplastic elastomer. In this production method, a network structure having satisfactory low-repulsion characteristics can be obtained, but it is difficult to produce a network structure having excellent high-repulsion characteristics.

PRIOR ART DOCUMENTS

Patent Documents

Patent Document 1: JP-A-7-68061
Patent Document 2: JP-A-2004-244740
Patent Document 3: JP-A-2006-200118

SUMMARY OF THE INVENTION

Problems to be Solved by the Invention

The present invention has been completed in consideration of the problems of conventional techniques described above, and aims at providing a network structure having excellent repeated compression durability, a low repeated compression residual strain and a high hardness retention after repeated compression.

Solutions to the Problems

The present invention has been completed as result of wholehearted investigation performed by the present inventors in order to solve the above-described problems. That is, the present invention includes:

1. A network structure made of a three-dimensional random loop bonded structure obtained by forming random loops with curling treatment of a continuous linear structure including at least one thermoplastic elastic resin selected from the group consisting of a polyolefin-based thermoplastic elastomer, an ethylene-vinyl acetate copolymer, a polyurethane-based thermoplastic elastomer and a polyamide-based thermoplastic elastomer, the continuous linear structure having a fineness of not less than 100 dtex and not more than 60000 dtex, and by making each loop mutually contact in a molten state, wherein the network structure has an apparent density of 0.005 $g/cm^3$ to 0.20 $g/cm^3$, a 50%-constant displacement repeated compression residual strain of not more than 15%, and a 50%-compression hardness retention after 50%-constant displacement repeated compression of not less than 85%.

2. The network structure according to the above 1, wherein the hysteresis loss is not more than 35%.

3. The network structure according to the above 1 or 2, wherein the three-dimensional random loop bonded structure includes a polyolefin-based thermoplastic elastomer, and the 25%-compression hardness retention after 50%-constant displacement repeated compression is not less than 80%.

4. The network structure according to the above 1 or 2, wherein the three-dimensional random loop bonded structure includes an ethylene-vinyl acetate copolymer, and the 25%-compression hardness retention after 50%-constant displacement repeated compression is not less than 65%.

5. The network structure according to the above 1 or 2, wherein the three-dimensional random loop bonded structure includes a polyurethane-based thermoplastic elastomer or a polyamide-based thermoplastic elastomer, and the 25%-compression hardness retention after 50%-constant displacement repeated compression is not less than 75%.

6. The network structure according to the above 1 to 5, wherein the thickness of the network structure is not less than 10 mm and not more than 300 mm.

7. The network structure according to the above 1 to 6, wherein the shape of the cross section of the continuous linear structure that forms the network structure is a hollow cross section and/or a modified cross section.

Effects of the Invention

A network structure according to the present invention is a network structure having excellent repeated compression durability, a low repeated compression residual strain and high hardness retention after repeated compression and hardly causing a change in sitting comfort and sleeping comfort even after repeated use. Further, the network structure also has excellent high-repulsion characteristics. The excellent repeated compression durability and high-repulsion characteristics have made it possible to provide a network structure suitable for cushioning materials that are used for office chairs, furniture, sofas, beddings such as beds, and seats for vehicles such as those for trains, automobiles, two-wheeled vehicles and buggies and child seats; floor mats; and mats for impact absorption such as members for prevention of collision and nipping, etc.

BRIEF DESCRIPTION OF THE DRAWINGS

FIG. 1 is a schematic graph of a compression/decompression test in the hysteresis loss measurement of a network structure.

MODE FOR CARRYING OUT THE INVENTION

Hereinafter, the present invention will be described in detail.

The network structure of the present invention is a network structure made of a three-dimensional random loop bonded structure obtained by forming random loops with curling treatment of a continuous linear structure including at least one thermoplastic elastic resin selected from the group consisting of a polyolefin-based thermoplastic elastomer, an ethylene-vinyl acetate copolymer, a polyurethane-based thermoplastic elastomer and a polyamide-based thermoplastic elastomer, the continuous linear structure having a fineness of not less than 100 dtex and not more than 60000 dtex, and by making each loop mutually contact in a molten state, wherein the network structure has an apparent density of 0.005 g/cm$^3$ to 0.20 g/cm$^3$, a 50%-constant displacement repeated compression residual strain of not more than 15%, and a 50%-compression hardness retention after 50%-constant displacement repeated compression of not less than 85%.

As the polyolefin-based thermoplastic elastomer in the present invention, the polymer that forms the network structure is preferably a low-density polyethylene resin having a specific gravity of not more than 0.94 g/cm$^3$, and particularly preferably a resin including an ethylene/α-olefin copolymer resin formed of ethylene and an α-olefin with a carbon number of not less than 3. The ethylene/α-olefin copolymer in the present invention is preferably a copolymer as described in JP-A-6-293813, and is formed by copolymerizing ethylene and an α-olefin with a carbon number of not less than 3. Here, examples of the α-olefin with a carbon number of not less than 3 include propylene, butene-1, pentene-1, hexene-1, 4-methyl-1-pentene, heptene-1, octene-1, nonene-1, decene-1, undecene-1, dodecene-1, tridecene-1, tetradecene-1, pentadecene-1, hexadecene-1, heptadecene-1, octadecene-1, nonadecene-1 and eicosene-1. Preferred are butene-1, pentene-1, hexene-1, 4-methyl-1-pentene, heptene-1, octene-1, nonene-1, decene-1, undecene-1, dodecene-1, tridecene-, tetradecene-1, pentadecene-1, hexadecene-1, heptadecene-1, octadecene-1, nonadecene-1 and eicosene-1. Two or more of these α-olefins may be used, and such α-olefins are copolymerized normally in an amount of 1 to 40% by weight. This copolymer can be obtained by copolymerizing ethylene and an α-olefin using a catalyst having a metallocene compound and an organic metal compound as basic components.

Two or more polymers polymerized by the above-mentioned method, or polymers such as hydrogenated polybutadiene and hydrogenated polyisoprene may be blended as necessary. As modifiers, an antioxidant, a weather-resistant agent, a flame retardant and the like may be added.

It is not preferred that the polyolefin-based thermoplastic elastomer in the present invention has a specific gravity of more than 0.94 g/cm$^3$ because the cushion material becomes excessively hard. The specific gravity is more preferably not more than 0.935 g/cm$^3$, further preferably not more than 0.93 g/cm$^3$. The lower limit of the specific gravity is not particularly defined, but it is preferably not less than 0.8 g/cm$^3$, more preferably not less than 0.85 g/cm$^3$ for retaining the strength.

Preferably, a component including the polyolefin-based thermoplastic elastomer, which forms the network structure having excellent repeated compression durability according to the present invention, has an endothermic peak at a temperature of not higher than the melting point in a melting curve obtained by measurement using a differential scanning calorimeter. Those having an endothermic peak at a temperature of not higher than the melting point have significantly improved heat and setting resistance as compared to those having no endothermic peak. For example, in case where the preferred polyolefin-based thermoplastic elastomer in the present invention is an ethylene/α-olefin copolymer obtained by polymerizing hexane, hexene and ethylene by a known method using a metallocene compound as a catalyst, crystallinity of the hard segment is improved, plastic deformation is hard to occur, and heat and setting resistance is improved when the number of branches of the main chain is decreased. When annealing treatment is further performed at a temperature lower by at least 10° C. than the melting point after hot-melt bonding, heat and setting resistance is further improved. It suffices that the sample can be heat-treated at a temperature lower by at least 10° C. than the melting point in annealing treatment, but heat and setting resistance is further improved when a compressive strain is imparted. An endothermic peak appears more clearly at a temperature of not lower than room temperature and not higher than the melting point in a melting curve obtained by measuring the cushioning layer treated as described above using a differential scanning calorimeter. When annealing is not performed, an endothermic peak does not appear clearly in the melting curve at a temperature of not lower than room temperature and not higher than the melting point. From this, it can be thought that by annealing, a hard segment is rearranged to form a semi-stable intermediate phase, so that heat and setting resistance is improved. The improved setting resistance effect in the present invention is effective to the applications supposed to involve relatively frequent repeated compression, such as cushions and flooring mats in order to improve durability in those applications.

As the ethylene-vinyl acetate copolymer in the present invention, the polymer that forms a network structure has a specific gravity of preferably 0.91 to 0.965. The specific gravity varies depending on a content of vinyl acetate, and the content of vinyl acetate is preferably 1 to 35%. When the content of vinyl acetate is low, rubber elasticity may be reduced, and accordingly the content of vinyl acetate is preferably not less than 1%, more preferably not less than 2%, further preferably not less than 3%. When the content of vinyl acetate is high, rubber elasticity is improved, but heat resistance may be reduced because the melting point decreases, and therefore the content of vinyl acetate is preferably not more than 35%, more preferably not more than 30%, further preferably not more than 26%.

The ethylene-vinyl acetate copolymer in the present invention can also be obtained by copolymerizing an α-olefin with a carbon number of not less than 3. Here, examples of the α-olefin with a carbon number of not less than 3 include propylene, butene-1, pentene-1, hexene-1, 4-methyl-1-pentene, heptene-1, octene-1, nonene-1, decene-1, undecene-1, dodecene-1, tridecene-1, tetradecene-1, pentadecene-1, hexadecene-1, heptadecene-1, octadecene-1, nonadecene-1 and eicosene-1. Preferred are butene-1, pentene-1, hexene-1, 4-methyl-1-pentene, heptene-1, octene-1, nonene-1, decene-1, undecene-1, dodecene-1, tridecene-1, tetradecene-1, pentadecene-1, hexadecene-1, heptadecene-1, octadecene-1, nonadecene-1 and eicosene-1. Two or more of these α-olefins may be used.

Two or more polymers polymerized by the above-mentioned method, or polymer modifiers such as hydrogenated polybutadiene and hydrogenated polyisoprene may be blended as necessary. As modifiers, a lubricant, an antioxidant, a weather-resistant agent, a flame retardant and the like may be added as necessary.

Preferably, a component including the ethylene-vinyl acetate copolymer, which forms the network structure having excellent repeated compression durability according to the present invention, has an endothermic peak at a temperature of not higher than the melting point in a melting curve obtained by measurement using a differential scanning calorimeter. Those having an endothermic peak at a temperature of not higher than the melting point have significantly improved heat and setting resistance as compared to those having no endothermic peak. For example, the content of vinyl acetate in the preferred ethylene-vinyl acetate copolymer in the present invention is preferably not more than 35%, more preferably not more than 30%, further preferably not more than 26%. When the content of vinyl acetate is decreased, crystallinity of the hard segment is improved, plastic deformation is hard to occur, and heat and setting resistance is improved. When annealing treatment is further performed at a temperature lower by at least 10° C. than the melting point after hot-melt bonding, heat and setting resistance is further improved. It suffices that the sample can be heat-treated at a temperature lower by at least 10° C. than the melting point in annealing treatment, but heat and setting resistance is further improved when a compressive strain is imparted. An endothermic peak appears more clearly at a temperature of not lower than room temperature and not higher than the melting point in a melting curve obtained by measuring the cushioning layer treated as described above using a differential scanning calorimeter. When annealing is not performed, an endothermic peak does not appear clearly in the melting curve at a temperature of not lower than room temperature and not higher than the melting point. From this, it can be thought that by annealing, a hard segment is rearranged to form a semi-stable intermediate phase, so that heat and setting resistance is improved. The improved setting resistance effect in the present invention is effective to the applications supposed to involve relatively frequent repeated compression, such as cushions and flooring mats in order to improve durability in those applications. For improving setting resistance, it is also effective to increase the molecular weight of the vinyl acetate copolymer.

As the polyurethane-based thermoplastic elastomer in the present invention, a chain-extending polyurethane elastomer obtained by reacting prepolymer having isocyanate groups at both ends, which is obtained by the reaction of (A) a polyether and/or polyester having a number average molecular weight of 1000 to 6000 and having a hydroxyl group at the end and (B) a polyisocyanate mainly composed of an organic diisocyanate in the presence or absence of a normal solvent (dimethyl formamide, dimethyl acetamide, etc.), and (C) a polyamine mainly composed of diamine may be mentioned as a typical example. The preferable (A) polyester or polyether include polybutylene adipate copolymerized polyesters and polyalkylene diols such as polyethylene glycol, polypropylene glycol, polytetramethylene glycol, and a glycol including an ethylene oxide-propylene oxide copolymer, each of which has a number average molecular weight of about 1000 to 6000, preferably 1.300 to 5000. The preferable (B) polyisocyanate include a previously known polyisocyanate, but an isocyanate mainly composed of diphenylmethane-4,4'-diisocyanate, as necessary a very small amount of a previously known triisocyanate etc. may be added thereto. The (C) polyamine may be mainly composed of a known diamine such as ethylene diamine or 1,2-propylene diamine, and a very small amount of a triamine or tetraamine may be used in combination as necessary. These polyurethane-based thermoplastic elastomers may be used alone, or used in combination of two or more thereof.

The melting point of the polyurethane-based thermoplastic elastomer in the present invention is preferably 140° C. or higher at which heat resistance/durability can be retained, and a melting point of 150° C. or higher is more preferred because heat resistance/durability is improved. Durability can be improved by adding an antioxidant, a light-resistant agent or the like as necessary. For improving heat resistance/durability and setting resistance, it is also effective to increase the molecular weight of the polyurethane-based thermoplastic elastomer.

The polyurethane-based thermoplastic elastomer in the present invention also encompasses those with a non-elastomer component blended or copolymerized with the above-mentioned polyurethane-based thermoplastic elastomer, those having a polyolefin-based component as a soft segment, and so on. Further, those with various kinds of additives etc. added to the polyurethane-based thermoplastic elastomer are also encompassed.

The content of the soft segment in the polyurethane-based thermoplastic elastomer is preferably not less than 15% by weight, more preferably not less than 25% by weight, further preferably not less than 30% by weight, most preferably not less than 40% by weight for achieving high repulsion characteristics, a moderate hardness and repeated compression durability of the network structure intended by the present invention, and is preferably not more than 80% by weight, more preferably not more than 70% by weight for securing a hardness and from the viewpoint of heat and setting resistance.

Preferably, a component including the polyurethane-based thermoplastic elastomer, which forms the network structure having excellent repeated compression durability according to the present invention, has an endothermic peak at a temperature of not higher than the melting point in a melting curve obtained by measurement using a differential scanning calorimeter. Those having an endothermic peak at a temperature of not higher than the melting point have significantly improved heat and setting resistance as compared to those having no endothermic peak. For example, when, as the preferred polyurethane-based thermoplastic elastomer in the present invention, an acid component of hard segment containing terephthalic acid or naphthalene-2,6-dicarboxylic acid etc. having stiffness in an amount of not less than 90% by mol, the content of terephthalic acid or naphthalene-2,6-dicarboxylic acid being more preferably not less than 959% by mol, further preferably 100% by mol, and a glycol component are subjected to transesterification, the resulting product is then polymerized to a necessary polymerization degree, and as a polyalkylene diol, preferably not less than 15% by weight and not more than 80% by weight, more preferably not less than 25% by weight and not more than 70% by weight, further preferably not less than 30% by weight and not more than 70% by weight, most preferably not less than 40% by weight and not more than 70% by weight of polytetramethylene glycol having an average molecular weight of not less than 500 and not more than 5000, more preferably not less than 700 and not more than 3000, further preferably not less than 800 and not more than 1800 is then copolymerized, crystallinity of the hard segment is improved, plastic deformation is hard to occur and heat and setting resistance is improved when the acid component of hard segment has a high content of terephthalic acid and naphthalene-2,6-dicarboxylic acid having stiffness. When annealing treatment is further performed at a temperature lower by at least 10° C. than the melting point after hot-melt bonding, heat and setting resistance is further improved. It suffices that the sample can be heat-treated at a temperature lower by at least 10° C. than the melting point in annealing treatment, but heat and setting resistance is further improved when a compressive strain is imparted. An endothermic peak appears more clearly at a temperature of not lower than room temperature and not higher than the melting point in a melting curve obtained by measuring the cushioning layer treated as described above using a differential scanning calorimeter. When annealing is not performed, an endothermic peak does not appear clearly in the melting curve at a temperature of not lower than room temperature and not higher than the melting point. From this, it can be thought that by annealing, a hard segment is rearranged to form a semi-stable intermediate phase, so that heat and setting resistance is improved. The improved heat resistance effect in the present invention is effective to the applications supposed to involve a relatively high temperature, such as cushions for vehicles in which a heater is used and flooring mats in order to improve setting resistance in those applications.

The polyamide-based thermoplastic elastomer in the present invention may be one obtained by copolymerizing a polyamide as a hard segment and a polyol as a soft segment, or the like. The polyamide compound of the hard segment may be at least one of polyamide oligomers obtained from reaction products of a lactam compound and a dicarboxylic acid, a diamine and a dicarboxylic acid, and so on. The soft segment may be at least one of polyether polyols, polyester polyols, polycarbonate polyols and the like.

The lactam compound may be at least one of aliphatic lactams with a carbon number of 5 to 20, such as γ-butyrolactam, ε-caprolactam, ω-heptalactam, ω-undecalactam and ω-lauryllactam.

The dicarboxylic acid may be at least one of dicarboxylic acid compounds such as aliphatic dicarboxylic acids with a carbon number of 2 to 20, such as oxalic acid, succinic acid, glutaric acid, adipic acid, pimelic acid, suberic acid, azelaic acid, sebacic acid and dodecanedioic acid; cycloaliphatic dicarboxylic acids such as cyclohexanedicarboxylic acids; and aromatic dicarboxylic acids such as terephthalic acid, isophthalic acid and orthophthalic acid.

The diamine may be at least one of aliphatic diamines such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine and 3-methypentamethylenediamine; and aromatic diamines such as meta-xylenediamine.

The polyether polyol may be at least one of polyalkylene diols such as polyethylene glycol, polypropylene glycol, polytetramethylene glycol, and a glycol including an ethylene oxide-propylene oxide copolymer, each of which has a number average molecular weight of 300 to 5000.

The polycarbonate diol may be a reaction product of a low-molecular diol and a carbonate compound, which has a number average molecular weight of 300 to 5000. The low-molecular diol may be at least one low-molecular diol selected from aliphatic diols such as ethylene glycol, 1,2-propylene glycol, 1,3-propylene glycol, 1,4-butanediol, 1,5-pentanediol, 3-methyl-1,5-pentanediol, 1,6-hexanediol, 1,7-heptanediol, 1,8-octanediol, 1,9-nonanediol and 1,10-decanediol; and cycloaliphatic diols such as cyclohexane dimethanol and cyclohexanediol. The carbonate compound may be at least one of dialkyl carbonates, alkylene carbonates, diaryl carbonates and the like.

The polyester polyol may be at least one of polyester diols such as polylactone having a number average molecular weight of 300 to 5000. The above-mentioned block copolymers may be used alone, or used in combination of two or more thereof.

Further, those obtained by blending or copolymerizing non-elastomer components, etc. may also be used in the present invention.

The melting point of the polyamide-based thermoplastic elastomer in the present invention is preferably 120° C. or higher at which heat resistance/durability can be retained, and a melting point of 130° C. or higher is more preferred because heat resistance/durability is improved. Durability can be improved by adding an antioxidant, a light-resistant agent or the like as necessary. For improving heat resistance/durability and setting resistance, it is also effective to increase the molecular weight of the polyamide-based thermoplastic elastomer.

The polyamide-based thermoplastic elastomer in the present invention also encompasses those with a non-elastomer component blended or copolymerized with the above-mentioned polyamide-based thermoplastic elastomer, those having a polyolefin-based component as a soft segment, and so on. Further, those with various kinds of additives etc. added to the polyamide-based thermoplastic elastomer are also encompassed.

The content of the soft segment in the polyamide-based thermoplastic elastomer is preferably not less than 5% by weight, more preferably not less than 10% by weight, further preferably not less than 15% by weight, most preferably not less than 20% by weight for achieving cushioning performance and durability of the network structure intended by the present invention, and is preferably not more than 80% by weight, more preferably not more than 70% by weight for securing a hardness and from the viewpoint of heat and setting resistance.

Preferably, a component including the polyamide-based thermoplastic elastomer, which forms the network structure having excellent repeated compression durability according to the present invention, has an endothermic peak at a temperature of not higher than the melting point in a melting curve obtained by measurement using a differential scanning calorimeter. Those having an endothermic peak at a temperature of not higher than the melting point have significantly improved heat and setting resistance as compared to those having no endothermic peak. For example, when, as the preferred polyamide-based thermoplastic elastomer in the present invention, a hard segment containing polyamide 6, polyamide 11 or polyamide 12 etc. in an amount of not less than 90% by mol, more preferably not less than 95% by mol, especially preferably not less than 100% by mol, and a glycol component are subjected to transesterification, the resulting product is then polymerized to a necessary polymerization degree, and as a polyalkylene diol, not less than 5% by weight and not more than 80% by weight, more preferably not less than 10% by weight and not more than 70% by weight, further preferably not less than 15% by weight and not more than 70% by weight, still further preferably not less than 20% by weight and not more than 70% by weight of polytetramethylene glycol having an average molecular weight of preferably not less than 500 and not more than 5000, more preferably not less than 700 and not more than 3000, further preferably not less than 800 and not more than 2000 is then copolymerized, crystallinity of the hard segment is improved, plastic deformation is hard to occur and heat and setting resistance is improved. When annealing treatment is further performed at a temperature lower by at least 10° C. than the melting point after hot-melt bonding, heat and setting resistance is further improved. It suffices that the sample can be heat-treated at a temperature lower by at least 10° C. than the melting point in annealing treatment, but heat and setting resistance is further improved when a compressive strain is imparted. An endothermic peak appears more clearly at a temperature of not lower than room temperature and not higher than the melting point in a melting curve obtained by measuring the cushioning layer treated as described above using a differential scanning calorimeter. When annealing is not performed, an endothermic peak does not appear clearly in the melting curve at a temperature of not lower than room temperature and not higher than the melting point. From this, it can be thought that by annealing, a hard segment is rearranged to form a semi-stable intermediate phase, so that heat and setting resistance is improved. The improved heat resistance effect in the present invention is effective to the applications supposed to involve a relatively high temperature, such as cushions for vehicles in which a heater is used and flooring mats in order to improve setting resistance in those applications.

The fineness of the continuous linear structure which forms the network structure of the present invention should be set in a proper range because when the fineness is small, a necessary hardness cannot be maintained when the network structure is used as a cushioning material, and conversely when the fineness is excessively large, the hardness becomes excessively high. The fineness is not less than 100 dtex, preferably not less than 300 dtex. When the fineness is less than 100 dtex, the network structure becomes so thin that although denseness and soft touch are improved, it is difficult to secure a hardness necessary as a network structure. The fineness is not more than 60000 dtex, preferably not more than 50000 dtex. When the fineness is more than 60000, the hardness of the network structure can be sufficiently secured, but the network structure may become coarse, leading to deterioration of other cushioning performance.

The apparent density of the network structure of the present invention is 0.005 g/cm$^3$ to 0.20 g/cm$^3$, preferably 0.01 g/cm$^3$ to 0.18 g/cm$^3$, more preferably 0.02 g/cm$^3$ to 0.15 g/cm$^3$. When the apparent density is smaller than 0.005 g/cm$^3$, a necessary hardness cannot be maintained when the network structure is used as a cushioning material, and conversely when the apparent density is more than 0.20 g/cm$^3$, the hardness may become so high that the network structure is unsuitable for a cushioning material.

The hysteresis loss of the network structure of the present invention is preferably not more than 35%, more preferably not more than 34%, further preferably not more than 33%, most preferably not more than 30%. A hysteresis loss of more than 35% is not preferred because a large force of repulsion may be hardly felt when a user is seated, and thus performance as a high-repulsion cushion is insufficient. The lower limit of the hysteresis loss is not particularly defined, but it is preferably not less than 1%, more preferably not less than 5% in the case of the network structure obtained in the present invention. When the hysteresis loss is less than 1%, the force of repulsion is so large that cushioning performance is deteriorated, and therefore the hysteresis loss is preferably not less than 1%, more preferably not less than 5%.

The thickness of the network structure of the present invention is preferably not less than 10 mm, more preferably not less than 20 mm. When the thickness is less than 10 mm, the network structure may be so thin that a bottoming feeling is given. The upper limit of the thickness is preferably not more than 300 mm, more preferably not more than 200 mm, further preferably not more than 120 mm in view of manufacturing equipment.

When the network structure of the present invention includes a polyurethane-based thermoplastic elastomer or a polyamide-based thermoplastic elastomer, the 70° C.-compression residual strain of the network structure is preferably not more than 35%. When the 70° C.-compression residual strain is more than 35%, properties as a network structure to be used for an intended cushioning material are not satisfied. The lower limit of the 70° C.-compression residual strain is not particularly defined, but it is not less than 1% in the case of the network structure obtained in the present invention.

The 50%-constant displacement repeated compression residual strain of the network structure of the present invention is not more than 15%, preferably not more than 10%. When the 50%-constant displacement repeated compression residual strain is more than 15%, the network structure is reduced in thickness after a long period of use, and is not preferred as a cushioning material. The lower limit of the 50%-constant displacement repeated compression residual strain is not particularly defined, but it is not less than 1% in the case of the network structure obtained in the present invention.

The 50%-compression hardness of the network structure of the present invention is preferably not less than 10 N/φ200 and not more than 1000 N/φ200. When the 50%-compression hardness is less than 10 N/φ200, a bottoming feeling may be given. When the 50%-compression hardness is more than 1000 N/φ200, the hardness may be so high that cushioning performance is impaired.

The 25%-compression hardness of the network structure of the present invention is preferably not less than 5 N/φ200 and not more than 500 N/φ200. When the 25%-compression hardness is less than 5 N/φ200, the hardness may be so low that cushioning performance may become insufficient. When the 25%-compression hardness is more than 500 N/φ200, the hardness may be so high that cushioning performance is impaired.

The 50%-compression hardness retention after 50%-constant displacement repeated compression of the network structure of the present invention is not less than 85%, preferably not less than 88%, more preferably not less than 90%. When the 50%-compression hardness retention after 50%-constant displacement repeated compression is less than 85%, a bottoming feeling may be given due to a decrease in hardness of a cushioning material with a long period of use. The upper limit of the 50%-compression hardness retention after 50%-constant displacement repeated compression is not particularly defined, but it is preferably not more than 120%, more preferably not more than 115%, most preferably not more than 110% in the case of the network structure obtained in the present invention. The reason why the 50%-compression hardness retention may exceed 100% is that there may be cases where the thickness of the network structure is reduced due to repeated compression, so that the apparent density of the network structure after repeated compression is increased. That leads to an increase in hardness of the network structure. When the hardness is increased due to repeated compression, cushioning performance is changed, and therefore the 50%-compression hardness retention is preferably not more than 120%, more preferably not more than 115%, most preferably not more than 110%.

When the network structure of the present invention includes a polyethylene-based thermoplastic elastomer, the 25%-compression hardness retention after 50%-constant displacement repeated compression of the network structure is preferably not less than 80%, more preferably not less than 82%, further preferably not less than 83%, most preferably not less than 85%. When the 25%-compression hardness retention after 50%-constant displacement repeated compression is less than 80%, the hardness of a cushioning material may be reduced with a long period of use, leading to a change in sitting comfort. The upper limit of the 25%-compression hardness retention after 50%-constant displacement repeated compression is not particularly defined, but it is preferably not more than 120%, more preferably not more than 110% in the network structure obtained in the present invention. The reason why the 25%-compression hardness retention may exceed 100% is that there may be cases where the thickness of the network structure is reduced due to repeated compression, so that the apparent density of the network structure after repeated compression is increased. That leads to an increase in hardness of the network structure. When the hardness is increased due to repeated compression, cushioning performance is changed, and therefore the 25%-compression hardness retention is preferably not more than 120%, more preferably not more than 110%.

The network structure of the present invention, when including a polyethylene-based thermoplastic elastomer, has such properties that the 50%-compression hardness retention after 50%-constant displacement repeated compression is not less than 85%, and the 25%-compression hardness retention after 50%-constant displacement repeated compression is not less than 80%. Only when the hardness retention is in the above-described range, a network structure is obtained which has a reduced change in hardness after a long period of use and which can be used for a long period of time with a small change in sitting or sleeping comfort. Previously known network structures having a low 50%-constant displacement repeated compressive strain and the network structure of the present invention are different in that in the network structure of the present invention, fusion of continuous linear structures that form the network structure is made strong to increase the strength of contact points between continuous linear structures. By increasing the strength of contact points between continuous linear structures that form the network structure, the hardness retention after 50%-constant displacement repeated compression of the network structure can be improved. That is, it is considered that, in the case of previously known network structures, many of contact points between continuous linear structures that form the network structure are ruptured due to 50%-constant displacement repeated compression, but in the case of the network structure of the present invention, rupture of the contact points can be reduced as compared to conventional network structures.

On the other hand, for the 50%-constant displacement repeated compressive strain, it is considered that even if contact points of the network structure after repeated compression are ruptured, the compressive strain is low because the thickness is restored due to elasticity of a polyolefin-based thermoplastic elastomer that forms continuous linear structures, and therefore conventional network structures have a 50%-constant displacement repeated compressive strain which is not much different from that of the network structure of the present invention.

When the network structure of the present invention includes an ethylene-vinyl acetate copolymer, the 25%-compression hardness retention after 50%-constant displacement repeated compression of the network structure is preferably not less than 65%, more preferably not less than 68%, further preferably not less than 70%, most preferably not less than 75%. When the 25%-compression hardness retention after 50%-constant displacement repeated compression is less than 65%, the hardness of a cushioning material may be reduced with a long period of use, leading to a change in sitting comfort. The upper limit of the 25%-compression hardness retention after 50%-constant displacement repeated compression is not particularly defined, but it is preferably not more than 120%, more preferably not more than 110% in the network structure obtained in the present invention. The reason why the 25%-compression hardness retention may exceed 100% is that there may be cases where the thickness of the network structure is reduced due to repeated compression, so that the apparent density of the network structure after repeated compression is increased. That leads to an increase in hardness of the network structure. When the hardness is increased due to repeated compression, cushioning performance is changed, and therefore the 25%-compression hardness retention is preferably not more than 120%, more preferably not more than 110%.

The network structure of the present invention, when including an ethylene-vinyl acetate copolymer, has such properties that the 50%-compression hardness retention after 50%-constant displacement repeated compression is not less than 85%, and the 25%-compression hardness retention after 50%-constant displacement repeated compression is not less than 65%. Only when the hardness retention is in the above-described range, a network structure is obtained which has a reduced change in hardness after a long period of use and which can be used for a long period of time with a small change in sitting or sleeping comfort. Previously known network structures having a low 50%-constant displacement repeated compressive strain and the network structure of the present invention are different in that in the network structure of the present invention, fusion of continuous linear structures that form the network structure is made strong to increase the strength of contact points between continuous linear structures. By increasing the strength of contact points between continuous linear structures that form the network structure, the hardness retention after 50%-constant displacement repeated compression of the network structure can be improved. That is, it is considered that, in the case of previously known network structures, many of contact points between continuous linear structures that form the network structure are ruptured due to 50%-constant displacement repeated compression, but in the case of the network structure of the present invention, rupture of the contact points can be reduced as compared to conventional network structures.

On the other hand, for the 50%-constant displacement repeated compressive strain, it is considered that even if contact points of the network structure after repeated compression are ruptured, the compressive strain is low because the thickness is restored due to elasticity of an ethylene-vinyl acetate copolymer that forms continuous linear structures, and therefore conventional network structures have a 50%-constant displacement repeated compressive strain which is not much different from that of the network structure of the present invention.

When the network structure of the present invention includes a polyurethane-based thermoplastic elastomer, the 25%-compression hardness retention after 50%-constant displacement repeated compression of the network structure is preferably not less than 75%, more preferably not less than 78%, further preferably not less than 80%, most preferably not less than 85%. When the 25%-compression hardness retention after 50%-constant displacement repeated compression is less than 75%, the hardness of a cushioning material may be reduced with a long period of use, leading to a change in sitting comfort. The upper limit of the 25%-compression hardness retention after 50%-constant displacement repeated compression is not particularly defined, but it is preferably not more than 120%, more preferably not more than 110% in the network structure obtained in the present invention. The reason why the 25%-compression hardness retention may exceed 100% is that there may be cases where the thickness of the network structure is reduced due to repeated compression, so that the apparent density of the network structure after repeated compression is increased. That leads to an increase in hardness of the network structure. When the hardness is increased due to repeated compression, cushioning performance is changed, and therefore the 25%-compression hardness retention is preferably not more than 120%6, more preferably not more than 110%.

The network structure of the present invention, when including a polyurethane-based thermoplastic elastomer, has such properties that the 50%-compression hardness retention after 50%-constant displacement repeated compression is not less than 85%, and the 25%-compression hardness retention after 50%-constant displacement repeated compression is not less than 75%. Only when the hardness retention is in the above-described range, a network structure is obtained which has a reduced change in hardness after a long period of use and which can be used for a long period of time with a small change in sitting or sleeping comfort. Previously known network structures having a low 50%-constant displacement repeated compressive strain and the network structure of the present invention are different in that in the network structure of the present invention, fusion of continuous linear structures that form the network structure is made strong to increase the strength of contact points between continuous linear structures. By increasing the strength of contact points between continuous linear structures that form the network structure, the hardness retention after 50%-constant displacement repeated compression of the network structure can be improved. That is, in the case of previously known network structures, many of contact points between continuous linear structures that form the network structure are ruptured due to 50%-constant displacement repeated compression, but in the case of the network structure of the present invention, rupture of the contact points can be reduced as compared to conventional network structures.

On the other hand, for the 50%-constant displacement repeated compressive strain, it is considered that even if contact points of the network structure after repeated compression are ruptured, the compressive strain is low because the thickness is restored due to elasticity of a polyurethane-based thermoplastic elastomer that forms continuous linear structures, and therefore conventional network structures have a 50%-constant displacement repeated compressive strain which is not much different from that of the network structure of the present invention.

When the network structure of the present invention includes a polyamide-based thermoplastic elastomer, the 25%-compression hardness retention after 50%-constant displacement repeated compression of the network structure is preferably not less than 75%, more preferably not less than 78%, further preferably not less than 80%, most preferably not less than 85%. When the 25%-compression hardness retention after 50%-constant displacement repeated compression is less than 75%, the hardness of a cushioning material may be reduced with a long period of use, leading to a change in sitting comfort. The upper limit of the 25%-compression hardness retention after 50%-constant displacement repeated compression is not particularly defined, but it is preferably not more than 120%, more preferably not more than 115%, further preferably not more than 110% in the case of the network structure obtained in the present invention. The reason why the 25%-compression hardness retention may exceed 100% is that there may be cases where the thickness of the network structure is reduced due to repeated compression, so that the apparent density of the network structure after repeated compression is increased. That leads to an increase in hardness of the network structure. When the hardness is increased due to repeated compression, cushioning performance is changed, and therefore the 25%-compression hardness retention is preferably not more than 120%, more preferably not more than 115%, further preferably not more than 110%.

The network structure of the present invention, when including a polyamide-based thermoplastic elastomer, has such properties that the 50%-compression hardness retention after 50%-constant displacement repeated compression is not less than 85%, and the 25%-compression hardness retention after 50%6-constant displacement repeated compression is not less than 75%. Only when the hardness retention is in the above-described range, a network structure is obtained which has a reduced change in hardness after a long period of use and which can be used for a long period of time with a small change in sitting or sleeping comfort. Previously known network structures having a low 50%-constant displacement repeated compressive strain and the network structure of the present invention are different in that in the network structure of the present invention, fusion of continuous linear structures that form the network structure is made strong to increase the strength of contact points between continuous linear structures. By increasing the strength of contact points between continuous linear structures that form the network structure, the hardness retention after 50%-constant displacement repeated compression of the network structure can be improved. That is, in the case of previously known network structures, many of contact points between continuous linear structures that form the network structure are ruptured due to 50%-constant displacement repeated compression, but in the case of the network structure of the present invention, rupture of the contact points can be reduced as compared to conventional network structures.

On the other hand, for the 50%-constant displacement repeated compressive strain, it is considered that even if contact points of the network structure after repeated compression are ruptured, the compressive strain is low because the thickness is restored due to elasticity of a polyamide-based thermoplastic elastomer that forms continuous linear structures, and therefore conventional network structures have a 50%-constant displacement repeated compressive strain which is not much different from that of the network structure of the present invention.

The network structure of the present invention has such properties that the hysteresis loss is not more than 35%. Only when the hysteresis loss is in the above-described range, a network structure giving sitting or sleeping comfort with a large force of repulsion is obtained. In the network structure of the present invention, fusion of continuous linear structures that form a network structure is made strong to increase the strength of contact points between continuous linear structures. The mechanism of increasing the strength of contact points to reduce the hysteresis loss is complicated, and has not been fully cleared, but it can be presumed as follows.

When the strength of contact points between continuous linear structures that form a network structure is increased, rupture of contact points is hard to occur when the network is compressed. Next, when stress is released from the compressed state and the network structure is restored from the deformed state, the contact points are not ruptured but maintained, and therefore restoration from the deformed state is accelerated to reduce the hysteresis loss. That is, it is considered that in previously known network structures, many of contact points between continuous linear structures that form a network structure are ruptured due to prescribed preliminary compression or second compression, but in the network structure of the present invention, rupture of contact points can be reduced as compared to the conventional network structures, and maintained contact points enable more effective use of rubber elasticity intrinsic to the polymer to be used.

For example, the network structure of the present invention having a high hardness retention after 50%-constant displacement repeated compression is obtained in the following manner. The network structure is obtained in accordance with a publicly known method described in JP-A-7-68061 etc. For example, at least one thermoplastic elastic resin selected from the group consisting of a polyolefin-based thermoplastic elastomer, an ethylene-vinyl acetate copolymer, a polyurethane-based thermoplastic elastomer and a polyamide-based thermoplastic elastomer is distributed to nozzle orifices from a multi-row nozzle having a plurality of orifices, and discharged downward through the nozzle at a spinning temperature higher by not less than 20° C. and less than 150° C. than the melting point of the thermoplastic elastic resin, the continuous linear structures are mutually contacted in a molten state and thereby fused to form a three-dimensional structure, which is sandwiched by a take-up conveyor net, cooled by cooling water in a cooling bath, then drawn out, and spin-dried, and then dried as necessary to obtain a network structure having both surfaces or one surface smoothed. When only one surface is to be smoothed, the thermoplastic elastic resin may be discharged onto an inclined take-up net, and the continuous linear structures may be mutually contacted in a molten state and thereby fused to form a three-dimensional structure, which may be cooled while the form of only the take-up net surface is relaxed. The obtained network structure can also be subjected to annealing treatment. Drying treatment of the network structure may be performed by annealing treatment.

For obtaining the network structure of the present invention, fusion of continuous linear structures of a network structure to be obtained should be made strong to increase the strength of contact points between the continuous linear structures. By increasing the strength of contact points between continuous linear structures that form the network structure, repeated compression durability of the network structure can be resultantly improved.

As one of means for obtaining a network structure with an increased strength of contact points, for example, a heat-retaining region is provided below a nozzle when at least one thermoplastic elastic resin selected from the group consisting of a polyolefin-based thermoplastic elastomer, an ethylene-vinyl acetate copolymer, a polyurethane-based thermoplastic elastomer and a polyamide-based thermoplastic elastomer is spun. It is also conceivable that the spinning temperature of at least one thermoplastic elastic resin selected from the group consisting of a polyolefin-based thermoplastic elastomer, an ethylene-vinyl acetate copolymer, a polyurethane-based thermoplastic elastomer and a polyamide-based thermoplastic elastomer is increased, but it is preferred to provide a heat-retaining region below a nozzle from the viewpoint of preventing heat degradation of the polymer. The length of the heat-retaining region below a nozzle is preferably not less than 20 mm, more preferably not less than 35 mm, still more preferably not less than 50 mm. The upper limit of the length of the heat-retaining region is preferably not more than 70 mm. When the length of the heat-retaining region is not less than 20 mm, fusion of continuous linear structures of a network structure to be obtained becomes strong, strength of contact points between continuous linear structures is increased, and resultantly repeated compression durability of the network structure can be improved. When the length of the heat-retaining region is less than 20 mm, the strength of contact points is not improved to the extent that satisfactory repeated compression durability can be achieved. When the length of the heat-retaining region is more than 70 mm, surface quality may be deteriorated.

For the heat-retaining region, a periphery of a spin pack or an amount of heat carried by the polymer may be used to form a heat-retaining region, or the temperature of a fiber-falling region immediately below a nozzle may be controlled by heating the heat-retaining region with a heater. For the heat-retaining region, a heat-retaining material may be provided so as to surround the circumference of falling continuous linear structures below the nozzle by using an iron plate, an aluminum plate, a ceramic plate etc. More preferably the heat-retaining material is formed from the above-described materials, and these materials are covered with a heat-insulating material. As a position where the heat-retaining region is provided, in consideration of the heat-retaining effect, the heat-retaining region is preferably provided downward from a position of not more than 50 mm below the nozzle, more preferably from a position of not more than 20 mm below the nozzle, further preferably from immediately below the nozzle. As one of preferred embodiments, the periphery of an area immediately below the nozzle is surrounded by an aluminum plate with a length of 20 mm downward from immediately below the nozzle such that the aluminum plate does not come into contact with a string, thereby retaining heat, and further the aluminum plate is covered with a heat-retaining material.

As another means for obtaining a network structure having an increased strength of contact points, the net surface temperature of a take-up conveyor net is increased at or around the falling position of continuous linear structures, or the temperature of cooling water in a cooling bath is increased at or around the falling position of continuous linear structures. The surface temperature of the take-up conveyor net is preferably not less than 40° C., more preferably not less than 50° C., further preferably not less than 60° C. when the network structure includes a polyolefin-based thermoplastic elastomer or an ethylene-vinyl acetate copolymer, and the surface temperature of the take-up conveyor net is preferably not less than 80° C. more preferably not less than 100° C. when the network structure includes a polyurethane-based thermoplastic elastomer or a polyamide-based thermoplastic elastomer. For keeping good peeling properties between the continuous linear structure and the conveyor net, the conveyor net temperature is preferably not more than the melting point of the polymer, more preferably lower by not less than 20° C. than the melting point. The temperature of cooling water is preferably not less than 25° C. when the network structure includes a polyolefin-based thermoplastic elastomer or an ethylene-vinyl acetate copolymer, and the temperature of cooling water is preferably not less than 80° C. when the network structure includes a polyurethane-based thermoplastic elastomer or a polyamide-based thermoplastic elastomer.

The continuous linear structure that forms the network structure of the present invention may be formed as a complex linear structure obtained by combination with other thermoplastic resins within the bounds of not impairing the object of the present invention. When the linear structure itself is complexed, examples of the complexed form include complex linear structures of sheath-core type, side-by-side type and eccentric sheath-core type.

The network structure of the present invention may be formed as a multilayered structure within the bounds of not impairing the object of the present invention. Examples of the multilayered structure include a structure in which the surface layer and the back surface layer are formed of linear structures having different finenesses and a structure in which the surface layer and the back surface layer are formed of structures having different apparent densities. Examples of the method for forming a multilayered structure include methods in which network structures are stacked on one after another, and fixed by side ground etc., melted and fixed by heating, bonded with an adhesive, or bound by sewing or a band.

The shape of the cross section of the continuous linear structure that forms the network structure of the present invention is not particularly limited, but when the cross section is a hollow cross section and/or a modified cross section, preferred compression resistance and touch characteristics can be imparted.

The network structure of the present invention can be processed into a molded article from a resin manufacture process within the bounds of not deteriorating the performance, and at any stage at which the network structure is processed into a product, treated/processed by addition of chemicals, etc. to impart functions such as antibacterial deodorization, deodorization, mold prevention, coloring, fragrance, flame resisting and moisture absorption/desorption.

The network structure of the present invention thus obtained has excellent repeated compression durability with a low repeated compression residual strain and a high hardness retention. Further, the network structure has high-repulsion characteristics.

EXAMPLES

Hereinafter, the present invention will be described in detail by way of examples, but the present invention is not limited thereto. Measurement and evaluation of characteristic values in examples were performed by the following methods.

(1) Fineness

A sample is cut into a size of 20 cm×20 cm, and linear structures were taken at 10 points. A specific gravity of each of the linear structures taken at 10 points is measured at 40° C. using a density gradient tube. Further, a cross-section area of each of the linear structures taken at the 10 points is determined from a photograph magnified by 30 times under a microscope, and a volume of the linear structure for the length of 10000 m is determined from the cross-section area. A product of the obtained specific gravity and volume is determined as a fineness (weight for 10000 m of the linear structure) (average of n=10).

(2) Sample Thickness and Apparent Density

A sample is cut into a size of 30 cm×30 cm, the cut sample is kept standing with no load for 24 hours, and then measured for the height at 4 points using a thickness gauge Model FD-80N manufactured KOBUNSHI KEIKI CO., LTD., and the average of the measured values is determined as the sample thickness. The sample weight is measured by placing the sample on an electronic balance. The volume is determined from the sample thickness, and the sample weight is divided by the volume to obtain a value as the apparent density (average of n=4 in each case).

(3) Melting Point (Tm)

An endothermic peak (melting peak) temperature was determined from an endothermic/exothermic curve obtained by measurement at a heating rate of 20° C./min using a differential scanning calorimeter Q200 manufactured by TA Instruments.

(4) 70° C.-Compression Residual Strain

A sample is cut into a size of 30 cm×30 cm, and the cut sample is measured for a thickness (a) before treatment using the method described in (2). The sample, whose thickness has been measured, is sandwiched in a tool capable of being held in a 50%-compression state, placed in a dryer set at 70° C., and kept standing for 22 hours. Thereafter, the sample is taken out, and cooled to remove a compressive strain, a thickness (b) after standing for 1 day is determined, and the compression residual strain is calculated in accordance with the formula: $\{(a)-(b)\}/(a)\times 100$ from the thickness (b) and the thickness (a) before treatment (unit: %) (average of n=3).

(5) 25%- and 50%-Compression Hardness

A sample is cut into a size of 30 cm×30 cm, and the cut sample is kept standing under an environment of 20° C.±2° C. with no load for 24 hours, the central part of the sample is then compressed at a speed of 10 mm/min with a φ200 mm compression board having a thickness of 3 mm using a tensilon manufactured by ORIENTEC Co., LTD., which is placed under an environment of 20° C.±2° C., and the thickness at a load of 5 N is measured as a hardness-meter thickness. The position of the compression board at this time is defined as a zero position, and the sample is compressed to 75% of the hardness-meter thickness at a speed of 100 mm/min, followed by returning the compression board to the zero point at a speed of 100 mm/min. Subsequently, the sample is compressed to 25% and 50% of the hardness-meter thickness at a speed of 100 mm/min, and loads at this time are measured as a 25%-compression hardness and a 50%-compression hardness, respectively (unit: N/φ200) (average of n=3).

(6) 50%-Constant Displacement Repeated Compression Residual Strain

A sample is cut into a size of 30 cm×30 cm, and the cut sample is measured for a thickness (c) before treatment using the method described in (2). The sample, whose thickness has been measured, is repeatedly compressed to a thickness of 50% and restored in a cycle of 1 Hz under an environment of 20° C.±2° C. using Servopulser manufactured by Shimadzu Corporation, the sample after 80000 times of repetition is kept standing for 1 day, followed by determining a thickness (d) after treatment, and the 50%-constant displacement repeated compression residual strain is calculated in accordance with the formula: $\{(c)-(d)\}/(c) \times 100$ from the thickness (d) and the thickness (c) before treatment (unit: %) (average of n=3).

(7) 50%-Compression Hardness Retention after 50%-Constant Displacement Repeated Compression A sample is out into a size of 30 cm×30 cm, and the cut sample is measured for a thickness before treatment using the method described in (2). The sample, whose thickness has been measured, is measured using the method described in (5), and the obtained 50%-compression hardness is defined as a load (e) before treatment. Thereafter, the sample is repeatedly compressed to 50% of the thickness before treatment and restored in a cycle of 1 Hz under an environment of 20° C.±2° C. using Servopulser manufactured by Shimadzu Corporation, the sample after 80000 times of repetition is kept standing for 30 minutes, and then measured using the method described in (5), and the obtained 50% compression hardness is defined as a load (f) after treatment. The 50%-compression hardness retention after 50%-constant displacement repeated compression is calculated in accordance with the formula: $(f)/(e) \times 100$ (unit: %) (average of n=3).

(8) 25%-Compression Hardness Retention after 50%-Constant Displacement Repeated Compression A sample is cut into a size of 30 cm×30 cm, and the cut sample is measured for a thickness before treatment using the method described in (2). The sample, whose thickness has been measured, is measured using the method described in (5), and the obtained 25%-compression hardness is defined as a load (g) before treatment. Thereafter, the sample is repeatedly compressed to 50% of the thickness before treatment and restored in a cycle of 1 Hz under an environment of 20° C.±2° C. using Servopulser manufactured by Shimadzu Corporation, the sample after 80000 times of repetition is kept standing for 30 minutes, and then measured using the method described in (5), and the obtained 25% compression hardness is defined as a load (h) after treatment. The 25%-compression hardness retention after 50%-constant displacement repeated compression is calculated in accordance with the formula: $(h)/(g) \times 100$ (unit: 6) (average of n=3).

(9) Hysteresis Loss

A sample is cut into a size of 30 cm×30 cm, and the cut sample is kept standing under an environment of 20° C.±2° C. with no load for 24 hours, the central part of the sample is then compressed at a speed of 10 mm/min with a 4200 mm compression board having a thickness of 3 mm using a tensilon manufactured by ORIENTEC Co., LTD., which is placed under an environment of 20° C.±2° C., and the thickness at a load of 5 N is measured as a hardness-meter thickness. The position of the compression board at this time is defined as a zero position, the sample is compressed to 75% of the hardness-meter thickness at a speed of 100 mm/min, and the compression board is returned to the zero position at the same speed without hold time (first stress strain curve). Subsequently, the sample is compressed to 75% of the hardness-meter thickness at a speed of 100 mm/min without hold time, and the compression board is returned to the zero position at the same speed without hold time (second stress strain curve).

The compression energy given by the second compression stress curve is defined as WC, and the compression energy given by the second decompression stress curve is defined as WC'. The hysteresis loss is determined in accordance with the following equation.

Hysteresis loss $(\%)=(WC-WC')/WC \times 100$

WC=∫PdT (workload at compression from 0% to 75%)
WC'=∫PdT (workload at decompression from 75% to 0%)

In a simplified manner, the hysteresis loss may be determined by data analysis with a personal computer when a stress strain curve as shown in, for example, FIG. 1 is obtained. Further, the area drawn in oblique lines is defined as WC and the area drawn in net-like lines is defined as WC'. The area ratio may be determined from the weight of paper of each area that is cut out (average of n=3).

Example 1-1

Hexane, hexene and ethylene were polymerized by a known method with a metallocene compound as a catalyst to prepare an ethylene/α-olefin copolymer, an antioxidant was then added thereto in an amount of 2%, and the resulting mixture was kneaded and pelletized to obtain a polyolefin-based thermoplastic elastomer. The obtained polyolefin-based thermoplastic elastomer (thermoplastic elastomer A-1) had a specific gravity of 0.919 g/cm³ and a melting point of 110° C. Vistamax 2125 (thermoplastic elastomer A-2) manufactured by ExxonMobil Chemical Company was used as a polypropylene-based thermoplastic elastomer. The polypropylene-based thermoplastic elastomer had a specific gravity of 0.87 g/cm³ and a melting point of 162° C.

The obtained polyolefin-based thermoplastic elastomer (A-1) was discharged downward from a nozzle at a melting temperature of 210° C. and a speed of 1.5 g/min in terms of discharge amount per single hole through orifices zigzag-arranged at a pitch between holes of 5 mm on a nozzle effective face of 1050 mm in the width direction and 55 mm in width in the thickness direction, each orifice shaped to have an outer diameter of 2 mm and an inner diameter of 1.6 mm and have a triple bridge hollow forming cross section. A heat-retaining region with a length of 30 mm was arranged immediately below the nozzle and cooling water of 35° C. was arranged at a position 30 cm below the nozzle face. Endless nets made of stainless steel each having a width of 150 cm were disposed parallel at an interval of 50 mm in opening width to form a pair of take-up conveyors so as to be partially exposed over a water surface. The conveyor nets over the water surface were heated with an infrared heater so as to have a surface temperature of 60° C., and the discharged threads in a molten state were curled to form loops, and contact parts were fused to form a three-dimensional network structure. The network in a molten state was sandwiched at both surfaces by the take-up conveyors, and drawn into cooling water at 35° C. at a speed of 0.8 m per minute, thereby solidified, flattened at both surfaces, then cut into a predetermined size, and dried/heat-treated with hot air at 70° C. for 15 minutes to obtain a network structure. The obtained network structure was formed of threads each having a hollow cross section as a cross-sectional shape, and having a hollowness of 24% and a fineness of 3000 dtex, and had an apparent density of 0.035 g/cm$^3$, a thickness of flattened surface of 49 mm a 25%-compression hardness of 110 N/φ200 mm, a 50%-compression hardness of 219 N/φ200 mm, a repeated compression residual strain of 9.7%, a 50%-compression hardness retention of 88.3% after 50%-constant displacement repeated compression, a 25%-compression hardness retention of 80.4% after 50%-constant displacement repeated compression, and a hysteresis loss of 27.7%. Thus, the network structure was excellent in repeated compression durability and in high-repulsion characteristics. The properties of the obtained network structure are shown in Table 1. The obtained network structure satisfied the requirements of the present invention, and was excellent in repeated compression durability and in high-repulsion characteristics.

Example 1-2

A network structure was obtained in the same manner as in Example 1-1 except that the length of the heat-retaining region immediately below the nozzle was 40 mm, the discharge amount per hole was 1.8 g/min, the distance between the nozzle face and cooling water was 32 cm, and the temperature of cooling water was 25° C. The obtained network structure was formed of threads each having a hollow cross section as a cross-sectional shape, and having a hollowness of 20% and a fineness of 2700 dtex, and had an apparent density of 0.045 g/cm$^3$, a thickness of flattened surface of 48 mm, a 25%-compression hardness of 155 N/φ200 mm, a 50%-compression hardness of 288 N/φ200 mm, a 50%-constant displacement repeated compression residual strain of 8.5%, a 50%-compression hardness retention of 98.3% after 50%-constant displacement repeated compression, a 25%-compression hardness retention of 82.3% after 50%-constant displacement repeated compression, and a hysteresis loss of 24.7%. The properties of the obtained network structure are shown in Table 1. The obtained network structure satisfied the requirements of the present invention, and was excellent in repeated compression durability and in high-repulsion characteristics.

Example 1-3

A network structure was obtained in the same manner as in Example 1-1 except that the discharge amount per hole was 2.0 g/min, the distance between the nozzle face and cooling water was 28 cm, and the conveyor nets were not heated, and were kept at a surface temperature of 40° C. The obtained network structure was formed of threads each having a hollow cross section as a cross-sectional shape, and having a hollowness of 229% and a fineness of 3300 dtex, and had an apparent density of 0.040 g/cm$^3$, a thickness of flattened surface of 51 mm, a 25%-compression hardness of 137 N/φ200 mm, a 50%-compression hardness of 242 N/φ200 mm, a 50%-constant displacement repeated compression residual strain of 9.0%, a 50%-compression hardness retention of 91.1% after 50%-constant displacement repeated compression, a 25%-compression hardness retention of 83.5% after 50%-constant displacement repeated compression, and a hysteresis loss of 33.5%. The properties of the obtained network structure are shown in Table 1. The obtained network structure satisfied the requirements of the present invention, and was excellent in repeated compression durability and in high-repulsion characteristics.

Example 1-4

A network structure was obtained in the same manner as in Example 1-1 except that the spinning temperature was 220° C., the length of the heat-retaining region immediately below the nozzle was 40 mm, the discharge amount per hole was 3.2 g/min, the take-up speed was 1.0 m per minute, the conveyor nets were heated with an infrared heater so as to have a surface temperature of 80° C., and the temperature of cooling water was 25° C. The obtained network structure was formed of threads each having a hollow cross section as a cross-sectional shape, and having a hollowness of 18% and a fineness of 2900 dtex, and had an apparent density of 0.061 g/cm$^3$, a thickness of flattened surface of 50 mm, a 25%-compression hardness of 267 N/φ200 mm, a 50%-compression hardness of 583 N/φ200 mm, a 50%-constant displacement repeated compression residual strain of 10.1%, a 50%-compression hardness retention of 105.6% after 50%-constant displacement repeated compression, a 25%-compression hardness retention of 85.0% after 50%-constant displacement repeated compression, and a hysteresis loss of 26.8%. The properties of the obtained network structure are shown in Table 1. The obtained network structure satisfied the requirements of the present invention, and was excellent in repeated compression durability and in high-repulsion characteristics.

Example 1-5

A network structure was obtained in the same manner as in Example 1-1 except that a polypropylene-based thermoplastic elastomer (thermoplastic elastomer A-2) was used, the spinning temperature was 230° C., the discharge amount per hole was 2.0 g/min, and the conveyor nets were not heated, and were kept at a surface temperature of 40° C. The obtained network structure was formed of threads each having a hollow cross section as a cross-sectional shape, and having a hollowness of 21% and a fineness of 3300 dtex, and had an apparent density of 0.041 g/cm$^3$, a thickness of flattened surface of 51 mm, a 25%-compression hardness of 58 N/φ200 mm, a 50%-compression hardness of 124 N/φ200 mm, a 50%-constant displacement repeated compression residual strain of 8.6%, a 50%-compression hardness retention of 88.2%6 after 50%-constant displacement repeated compression, a 25%-compression hardness retention of 81.1% after 50%-constant displacement repeated compression, and a hysteresis loss of 31.1%. The properties of the obtained network structure are shown in Table 1. The obtained network structure satisfied the requirements of the present invention, and was excellent in repeated compression durability and in high-repulsion characteristics.

Comparative Example 1-1

A network structure was obtained in the same manner as in Example 1-1 except that the heat-retaining region immediately below the nozzle was eliminated, the discharge amount per hole was 1.7 g/min, the take-up speed was 0.9 m per minute, and the distance between the nozzle face and cooling water was 32 cm. The obtained network structure was formed of threads each having a hollow cross section as a cross-sectional shape, and having a hollowness of 26% and a fineness of 3100 dtex, and had an apparent density of 0.035 g/cm$^3$, a thickness of flattened surface of 51 mm, a 25%-compression hardness of 112 N/φ200 mm, a 50%-compression hardness of 222 N/φ200 mm, a 50%-constant displacement repeated compression residual strain of 9.6%, a 50%-compression hardness retention of 78.8%6 after 50%-constant displacement repeated compression, a 25%-compression hardness retention of 74.4% after 50%-constant displacement repeated compression, and a hysteresis loss of 39.2%. The properties of the obtained network structure are shown in Table 1. The obtained network structure did not satisfy the requirements of the present invention, and was poor in repeated compression durability and in high-repulsion characteristics.

Comparative Example 1-2

A network structure was obtained in the same manner as in Example 1-1 except that the heat-retaining region immediately below the nozzle was eliminated, the discharge amount per hole was 2.0 g/min, the distance between the nozzle face and cooling water was 31 cm, the conveyor nets were not heated, and were kept at a surface temperature of 40° C., and the temperature of cooling water was 25° C. The obtained network structure was formed of threads each having a hollow cross section as a cross-sectional shape, and having a hollowness of 23% and a fineness of 3400 dtex, and had an apparent density of 0.050 g/cm$^3$, a thickness of flattened surface of 48 mm, a 25%-compression hardness of 192 N/φ200 mm, a 50%-compression hardness of 390 N/φ200 mm, a 50%-constant displacement repeated compression residual strain of 8.7%, a 50%-compression hardness retention of 75.5% after 50%-constant displacement repeated compression, a 25%-compression hardness retention of 78.0% after 50%-constant displacement repeated compression, and a hysteresis loss of 38.5%. The properties of the obtained network structure are shown in Table 1. The obtained network structure did not satisfy the requirements of the present invention, and was poor in repeated compression durability and in high-repulsion characteristics.

Comparative Example 1-3

A network structure was obtained in the same manner as in Example 1-1 except that a polypropylene-based thermoplastic elastomer (thermoplastic elastomer A-2) was used, the spinning temperature was 220° C., the heat-retaining region immediately below the nozzle was eliminated, the discharge amount per hole was 2.0 g/min, the distance between the nozzle face and cooling water was 22 cm, the conveyor nets were not heated, and were kept at a surface temperature of 40° C., and the temperature of cooling water was 25° C. The obtained network structure was formed of threads each having a hollow cross section as a cross-sectional shape, and having a hollowness of 29% and a fineness of 4000 dtex, and had an apparent density of 0.040 g/cm$^3$, a thickness of flattened surface of 50 mm, a 25%-compression hardness of 63 N/φ200 mm, a 50%-compression hardness of 133 N/φ200 mm, a 50%-constant displacement repeated compression residual strain of 9.5%, a 50%-compression hardness retention of 79.4% after 50%-constant displacement repeated compression, a 25%-compression hardness retention of 72.2% after 50%-constant displacement repeated compression, and a hysteresis loss of 41.0%. The properties of the obtained network structure are shown in Table 1. The obtained network structure did not satisfy the requirements of the present invention, and was poor in repeated compression durability and in high-repulsion characteristics.

TABLE 1

| Items | Example 1-1 | Example 1-2 | Example 1-3 | Example 1-4 | Example 1-5 | Comparative Example 1-1 | Comparative Example 1-2 | Comparative Example 1-3 |
|---|---|---|---|---|---|---|---|---|
| Thermoplastic elastic resin | A-1 | A-1 | A-1 | A-1 | A-2 | A-1 | A-1 | A-2 |
| Spinning temperature (° C.) | 210 | 210 | 210 | 220 | 230 | 210 | 210 | 220 |
| Heat-retaining length (mm) | 30 | 40 | 30 | 40 | 30 | 0 | 0 | 0 |
| Discharge amount per hole (g/min) | 1.5 | 1.8 | 2.0 | 3.2 | 2.0 | 1.7 | 2.0 | 2.0 |
| Take-up speed (m/min) | 0.8 | 0.8 | 0.8 | 1.0 | 0.8 | 0.9 | 0.8 | 0.8 |
| Distance between nozzle face and cooling water (cm) | 30 | 32 | 28 | 30 | 30 | 32 | 31 | 22 |
| Conveyor net temperature (° C.) | 60 | 60 | 40 | 80 | 40 | 60 | 40 | 40 |
| Cooling water temperature (° C.) | 35 | 25 | 35 | 25 | 35 | 35 | 25 | 25 |
| Apparent density (g/cm$^3$) | 0.035 | 0.045 | 0.040 | 0.061 | 0.041 | 0.035 | 0.050 | 0.040 |
| Thickness (mm) | 49 | 48 | 51 | 50 | 51 | 51 | 48 | 50 |
| Fineness (dtex) | 3000 | 2700 | 3300 | 2900 | 3300 | 3100 | 3400 | 4000 |
| 50%-Constant displacement repeated compression residual strain (%) | 9.7 | 8.5 | 9.0 | 10.1 | 8.6 | 9.6 | 8.7 | 9.5 |
| 25%-Compression hardness (N/φ200 mm) | 110 | 155 | 137 | 267 | 58 | 112 | 192 | 63 |
| 50%-Compression hardness (N/φ200 mm) | 219 | 288 | 242 | 583 | 124 | 222 | 390 | 133 |
| 50%-Compression hardness retention after 50%-constant displacement repeated compression | 88.3 | 98.3 | 91.1 | 105.6 | 88.2 | 78.8 | 75.5 | 79.4 |
| 25%-Compression hardness retention after 50%-constant displacement repeated compression | 80.4 | 82.3 | 83.5 | 85.0 | 81.1 | 74.4 | 78.0 | 72.2 |
| Hysteresis loss (%) | 27.7 | 24.7 | 33.5 | 26.8 | 31.1 | 39.2 | 38.5 | 41.0 |

Example 2-1

Ethylene and vinyl acetate were radical-copolymerized by a known method to prepare an ethylene-vinyl acetate copolymer, an antioxidant was then added thereto in an amount of 2%, and the resulting mixture was kneaded and pelletized to obtain an ethylene-vinyl acetate copolymer. The ratio of the vinyl acetate during polymerization was changed to obtain a thermoplastic elastomer B-1 having a vinyl acetate content of 10%, a thermoplastic elastomer B-2 having a vinyl acetate content of 20%, and a thermoplastic elastomer B-3 having a vinyl acetate content of 5%. The thermoplastic elastomer B-1 had a vinyl acetate content of 10%, a specific gravity of 0.929 and a melting point of 95° C., the thermoplastic elastomer B-2 had a vinyl acetate content of 20%, a specific gravity of 0.941 and a melting point of 85° C., and the thermoplastic elastomer B-3 had a vinyl acetate content of 5%, a specific gravity of 0.925 and a melting point of 103° C. The properties of the obtained polymers are shown in Table 2.

TABLE 2

| Experiment NO. | Specific gravity (—) | Vinyl acetate content (%) | Melting point (° C.) |
|---|---|---|---|
| B-1 | 0.929 | 10 | 95 |
| B-2 | 0.941 | 20 | 85 |
| B-3 | 0.925 | 5 | 103 |

The obtained ethylene-vinyl acetate copolymer B-1 was discharged downward from a nozzle at a melting temperature of 190° C. and a speed of 1.8 g/min in terms of discharge amount per single hole through orifices zigzag-arranged at a pitch between holes of 5 mm on a nozzle effective face of 1050 mm in the width direction and 50 mm in width in the thickness direction, each orifice shaped to have an outer diameter of 2 mm and an inner diameter of 1.6 mm and have a triple bridge hollow forming cross section. A heat-retaining region with a length of 30 mm was arranged immediately below the nozzle and cooling water of 50° C. was arranged at a position 32 cm below the nozzle face. Endless nets made of stainless steel each having a width of 150 cm were disposed parallel at an interval of 40 mm in opening width to form a pair of take-up conveyors so as to be partially exposed over a water surface. The conveyor nets over the water surface were heated with an infrared heater so as to have a surface temperature of 60° C., and the discharged threads in a molten state were curled to form loops, and contact parts were fused to form a three-dimensional network structure. The network in a molten state was sandwiched at both surfaces by the take-up conveyors, and drawn into cooling water at 50° C. at a speed of 0.9 m per minute, thereby solidified, flattened at both surfaces, then cut into a predetermined size, and dried/heat-treated with hot air at 50° C. for 15 minutes to obtain a network structure. The obtained network structure was formed of threads each having a hollow cross section as a cross-sectional shape, and having a hollowness of 25% and a fineness of 3100 dtex, and had an apparent density of 0.038 g/cm³, a thickness of flattened surface of 41 mm, a 25%-compression hardness of 118 N/φ200 mm, a 50%-compression hardness of 220 N/φ200 mm, a 50%-constant displacement repeated compression residual strain of 10.3%, a 50%9-compression hardness retention of 93.1% after 50%-constant displacement repeated compression, a 25%-compression hardness retention of 65.1% after 50%-constant displacement repeated compression, and a hysteresis loss of 24.5%. Thus, the network structure was excellent in repeated compression durability and in high-repulsion characteristics. The properties of the obtained network structure are shown in Table 3. The obtained network structure satisfied the requirements of the present invention, and was excellent in repeated compression durability and in high-repulsion characteristics.

Example 2-2

A network structure was obtained in the same manner as in Example 2-1 except that the spinning temperature was 200° C., the length of the heat-retaining region immediately below the nozzle was 40 mm, the discharge amount per hole was 2.7 g/min, the distance between the nozzle face and cooling water was 26 cm, the conveyor nets were not heated, and were kept at a surface temperature of 40° C., and the temperature of cooling water was 25° C. The obtained network structure was formed of threads each having a hollow cross section as a cross-sectional shape, and having a hollowness of 23% and a fineness of 3500 dtex, and had an apparent density of 0.058 g/cm³, a thickness of flattened surface of 40 mm, a 25%-compression hardness of 268 N/φ200 mm, a 50%-compression hardness of 511 N/φ200 mm, a 50%-constant displacement repeated compression residual strain of 8.4%, a 50%-compression hardness retention of 104.6% after 50%-constant displacement repeated compression, a 25%-compression hardness retention of 71.5% after 50%-constant displacement repeated compression, and a hysteresis loss of 25.2%. The properties of the obtained network structure are shown in Table 3. The obtained network structure satisfied the requirements of the present invention, and was excellent in repeated compression durability and in high-repulsion characteristics.

Example 2-3

A network structure was obtained in the same manner as in Example 2-1 except that the thermoplastic elastomer B-2 was used as a thermoplastic elastomer, the spinning temperature was 180° C., the length of the heat-retaining region immediately below the nozzle was 40 mm, the discharge amount per hole was 2.5 g/min, the distance between the nozzle face and cooling water was 30 cm, and the conveyor nets were not heated, and were kept at a surface temperature of 40° C. The obtained network structure was formed of threads each having a hollow cross section as a cross-sectional shape, and having a hollowness of 23% and a fineness of 3200 dtex, and had an apparent density of 0.055 g/cm³, a thickness of flattened surface of 39 mm, a 25%-compression hardness of 150 N/φ200 mm, a 50%-compression hardness of 298 N/φ200 mm, a 50%-constant displacement repeated compression residual strain of 9.6%, a 50%-compression hardness retention of 98.3% after 50%-constant displacement repeated compression, a 25%-compression hardness retention of 68.3% after 50%-constant displacement repeated compression, and a hysteresis loss of 28.0%. The properties of the obtained network structure are shown in Table 3. The obtained network structure satisfied the requirements of the present invention, and was excellent in repeated compression durability and in high-repulsion characteristics.

Example 2-4

A network structure was obtained in the same manner as in Example 2-3 except that the spinning temperature was 190° C., the length of the heat-retaining region immediately below the nozzle was 30 mm, the discharge amount per hole was 2.1 g/min, the take-up speed was 1.0 m per minute, the distance between the nozzle face and cooling water was 31 cm, the conveyor nets were heated with an infrared heater so as to have a surface temperature of 60° C., and the temperature of cooling water was 25° C. The obtained network structure was formed of threads each having a hollow cross section as a cross-sectional shape, and having a hollowness of 26%6 and a fineness of 3200 dtex, and had an apparent density of 0.041 g/cm³, a thickness of flattened surface of 40 mm, a 25%-compression hardness of 53 N/φ200 mm, a 50%-compression hardness of 123 N/φ200 mm, a 50%-constant displacement repeated compression residual strain of 10.7%, a 50%-compression hardness retention of 90.1% after 50%-constant displacement repeated compression, a 25%-compression hardness retention of 70.2% after 50%-constant displacement repeated compression, and a hysteresis loss of 32.1%6. The properties of the obtained network structure are shown in Table 3. The obtained network structure satisfied the requirements of the present invention, and was excellent in repeated compression durability and in high-repulsion characteristics.

Example 2-5

A network structure was obtained in the same manner as in Example 2-1 except that the thermoplastic elastomer B-3 was used as a thermoplastic elastomer, the spinning temperature was 200° C., the length of the heat-retaining region immediately below the nozzle was 40 mm, the discharge amount per hole was 2.0 g/min, and the distance between the nozzle face and cooling water was 29 cm. The obtained network structure was formed of threads each having a hollow cross section as a cross-sectional shape, and having a hollowness of 25% and a fineness of 3000 dtex, and had an apparent density of 0.045 g/cm³, a thickness of flattened surface of 41 mm, a 25%-compression hardness of 230 N/φ200 mm, a 50%-compression hardness of 421 N/φ200 mm, a 50%-constant displacement repeated compression residual strain of 9.0%, a 50%-compression hardness retention of 97.0% after 50%-constant displacement repeated compression, a 25%-compression hardness retention of 76.0% after 50%-constant displacement repeated compression, and a hysteresis loss of 28.8%. The properties of the obtained network structure are shown in Table 3. The obtained network structure satisfied the requirements of the present invention, and was excellent in repeated compression durability and in high-repulsion characteristics.

Comparative Example 2-1

A network structure was obtained in the same manner as in Example 2-1 except that the heat-retaining region immediately below the nozzle was eliminated, the discharge amount per hole was 1.9 g/min, the distance between the nozzle face and cooling water was 31 cm, and the opening width of each of the conveyor nets was 38 mm. The obtained network structure was formed of threads each having a hollow cross section as a cross-sectional shape, and having a hollowness of 30% and a fineness of 3300 dtex, and had an apparent density of 0.042 g/cm³, a thickness of flattened surface of 38 mm, a 25%-compression hardness of 136 N/φ200 mm, a 50%-compression hardness of 271 N/φ200 mm, a 50%-constant displacement repeated compression residual strain of 12.1%, a 50%-compression hardness retention of 82.3% after 50%-constant displacement repeated compression, a 25%-compression hardness retention of 58.8%6 after 50%-constant displacement repeated compression, and a hysteresis loss of 38.1%. The properties of the obtained network structure are shown in Table 3. The obtained network structure did not satisfy the requirements of the present invention, and was poor in repeated compression durability and in high-repulsion characteristics.

Comparative Example 2-2

A network structure was obtained in the same manner as in Comparative Example 2-1 except that the thermoplastic elastomer B-2 was used as a thermoplastic elastomer, the discharge amount per hole was 2.0 g/min, the take-up speed was 1.0 m per minute, and the distance between the nozzle face and cooling water was 28 cm. The obtained network structure was formed of threads each having a hollow cross section as a cross-sectional shape, and having a hollowness of 31% and a fineness of 3500 dtex, and had an apparent density of 0.038 g/cm³, a thickness of flattened surface of 38 mm, a 25%-compression hardness of 48 N/φ200 mm, a 50%-compression hardness of 110 N/φ200 mm, a 50%-constant displacement repeated compression residual strain of 10.1%, a 50%-compression hardness retention of 80.6% after 50%-constant displacement repeated compression, a 25%-compression hardness retention of 59.6% after 50%-constant displacement repeated compression, and a hysteresis loss of 40.2%. The properties of the obtained network structure are shown in Table 3. The obtained network structure did not satisfy the requirements of the present invention, and was poor in repeated compression durability and in high-repulsion characteristics.

Comparative Example 2-3

A network structure was obtained in the same manner as in Comparative Example 2-1 except that the thermoplastic elastomer B-3 was used as a thermoplastic elastomer, the spinning temperature was 200° C., the discharge amount per hole was 1.8 g/min, the distance between the nozzle face and cooling water was 30 cm, the conveyor nets were not heated, and were kept at a surface temperature of 40° C., and the temperature of cooling water was 25° C. The obtained network structure was formed of threads each having a hollow cross section as a cross-sectional shape, and having a hollowness of 28% and a fineness of 3400 dtex, and had an apparent density of 0.038 g/cm³, a thickness of flattened surface of 39 mm, a 25%-compression hardness of 175 N/φ200 mm, a 50%-compression hardness of 340 N/φ200 mm, a 50%-constant displacement repeated compression residual strain of 9.5%, a 50%-compression hardness retention of 83.1% after 50%-constant displacement repeated compression, a 25%-compression hardness retention of 61.9% after 50%-constant displacement repeated compression, and a hysteresis loss of 37.8%. The properties of the obtained network structure are shown in Table 3. The obtained network structure did not satisfy the requirements of the present invention, and was poor in repeated compression durability and in high-repulsion characteristics.

TABLE 3

| Items | Example 2-1 | Example 2-2 | Example 2-3 | Example 2-4 | Example 2-5 | Comparative Example 2-1 | Comparative Example 2-2 | Comparative Example 2-3 |
|---|---|---|---|---|---|---|---|---|
| Thermoplastic elastic resin | B-1 | B-1 | B-2 | B-2 | B-3 | B-1 | B-2 | B-3 |
| Spinning temperature (° C.) | 190 | 200 | 180 | 190 | 200 | 190 | 190 | 200 |

TABLE 3-continued

| Items | Example 2-1 | Example 2-2 | Example 2-3 | Example 2-4 | Example 2-5 | Comparative Example 2-1 | Comparative Example 2-2 | Comparative Example 2-3 |
|---|---|---|---|---|---|---|---|---|
| Heat-retaining length (mm) | 30 | 40 | 40 | 30 | 40 | 0 | 0 | 0 |
| Discharge amount per hole (g/min) | 1.8 | 2.7 | 2.5 | 2.1 | 2.0 | 1.9 | 2.0 | 1.8 |
| Take-up speed (m/min) | 0.9 | 0.9 | 0.9 | 1.0 | 0.9 | 0.9 | 1.0 | 0.9 |
| Distance between nozzle face and cooling water (cm) | 32 | 26 | 30 | 31 | 29 | 31 | 28 | 30 |
| Conveyor net temperature (° C.) | 60 | 40 | 40 | 60 | 60 | 60 | 40 | 40 |
| Cooling water temperature (° C.) | 50 | 25 | 50 | 25 | 50 | 50 | 50 | 25 |
| Apparent density (g/cm$^3$) | 0.038 | 0.058 | 0.055 | 0.041 | 0.045 | 0.042 | 0.038 | 0.038 |
| Thickness (mm) | 41 | 40 | 39 | 40 | 41 | 38 | 38 | 39 |
| Fineness (dtex) | 3100 | 3500 | 3200 | 3200 | 3000 | 3300 | 3500 | 3400 |
| 50%-Constant displacement repeated compression residual strain (%) | 10.3 | 8.4 | 9.6 | 10.7 | 9.0 | 12.1 | 10.1 | 9.5 |
| 25%-Compression hardness (N/φ200 mm) | 118 | 268 | 150 | 53 | 230 | 136 | 48 | 175 |
| 50%-Compression hardness (N/φ200 mm) | 220 | 511 | 298 | 123 | 421 | 271 | 110 | 340 |
| 50%-Compression hardness retention after 50%-constant displacement repeated compression (%) | 93.1 | 104.6 | 98.3 | 90.1 | 97.0 | 82.3 | 80.6 | 83.1 |
| 25%-Compression hardness retention after 50%-constant displacement repeated compression (%) | 65.1 | 71.5 | 68.3 | 70.2 | 76.0 | 58.8 | 59.6 | 61.9 |
| Hysteresis loss (%) | 24.5 | 25.2 | 28.0 | 32.1 | 28.8 | 38.1 | 40.2 | 37.8 |

Example 3-1

For the polyurethane-based elastomer, 4,4'-diphenylmethane diisocyanate (MDI), PTMG having a number average molecular weight of 1500, and 1,4-butanediol (1,4-BD) as a chain extender were mixed, and polymerized, an antioxidant was then added in an amount of 2%, and the resulting mixture was kneaded, then pelletized, and dried under vacuum at 50° C. for 48 hours to obtain a thermoplastic elastic resin C-1 having a PTMG content of 38% and a thermoplastic elastic resin C-2 having a PTMG content of 64%. The thermoplastic elastic resin C-1 had a PTMG content of 38% by weight and a melting point of 167° C., and the thermoplastic elastic resin C-2 had a PTMG content of 64% by weight and a melting point of 152° C. The compositions of the obtained polymers are shown in Table 4.

TABLE 4

| Experiment NO. | Hard segment | | Soft segment | | Melting point (° C.) |
| | Component | Glycol component | Component | Number average molecular weight | Content | |
|---|---|---|---|---|---|---|
| C-1 | MDI | 1,4-BD | PTMG | 1500 | 38% | 167 |
| C-2 | MDI | 1,4-BD | PTMG | 1500 | 64% | 152 |

The obtained thermoplastic elastic resin C-1 was discharged downward from a nozzle at a spinning temperature of 220° C. and a speed of 2.7 g/min in terms of discharge amount per single hole through orifices zigzag-arranged at a pitch between holes of 5 mm on a nozzle effective face of 1050 mm in the width direction and 50 mm in width in the thickness direction, each orifice shaped to have an outer diameter of 2 mm and an inner diameter of 1.6 mm and have a triple bridge hollow forming cross section. A heat-retaining region with a length of 30 mm was arranged immediately below the nozzle and cooling water of 30° C. was arranged at a position 26 cm below the nozzle face. Endless nets made of stainless steel each having a width of 150 cm were disposed parallel at an interval of 38 mm in opening width to form a pair of take-up conveyors so as to be partially exposed over a water surface. The conveyor nets over the water surface were not heated, and were kept at a surface temperature of 40° C., and the discharged threads in a molten state were curled to form loops, and contact parts were fused to form a three-dimensional network structure. The network in a molten state was sandwiched at both surfaces by the take-up conveyors, and drawn into cooling water at 30° C. at a speed of 1.4 m per minute, thereby solidified, flattened at both surfaces, then cut into a predetermined size, and dried/heat-treated with hot air at 110° C. for 15 minutes to obtain a network structure. The obtained network structure was formed of threads each having a hollow cross section as a cross-sectional shape, and having a hollowness of 30% and a fineness of 3300 dtex, and had an apparent density of 0.035 g/cm$^3$, a thickness of flattened surface of 38 mm, a 25%-compression hardness of 140 N/φ200 mm, a 50%-compression hardness of 271 N/φ200 mm, a repeated compression residual strain of 12.2%, a 70° C.-compression residual strain of 14.2%, a 50%-compression hardness retention of 92.5% after 50%-constant displacement repeated compression, a 25%-compression hardness retention of 80.1% after 50%-constant displacement repeated compression, and a hysteresis loss of 31.2%. Thus, the network structure was excellent in repeated compression durability and in high-repulsion characteristics. The properties of the obtained network structure are shown in Table 5. The obtained cushion satisfied the requirements of the present invention, and was excellent in repeated compression durability and in high-repulsion characteristics.

Example 3-2

A network structure was obtained in the same manner as in Example 3-1 except that the spinning temperature was 230° C., the length of the heat-retaining region immediately below the nozzle was 40 mm, the discharge amount per hole was 2.3 g/min, the take-up speed was 1.1 in per minute, the distance between the nozzle face and cooling water was 28 cm, the conveyor nets were heated with an infrared heater so as to have a surface temperature of 120° C., and cooling water was heated to 80° C. The obtained network structure was formed of threads each having a hollow cross section as a cross-sectional shape, and having a hollowness of 33% and a fineness of 3000 dtex, and had an apparent density of 0.042 g/cm³, a thickness of flattened surface of 38 mm, a 25%-compression hardness of 162 N/φ200 mm, a 50%-compression hardness of 305 N/φ200 mm, a 70° C.-compression residual strain of 9.7%, a 50%-constant displacement repeated compression residual strain of 9.6%, a 50%-compression hardness retention of 96.2% after 50%-constant displacement repeated compression, a 25%-compression hardness retention of 85.0% after 50%-constant displacement repeated compression, and a hysteresis loss of 28.4%. The properties of the obtained network structure are shown in Table 5. The obtained cushion satisfied the requirements of the present invention, and was excellent in repeated compression durability and in high-repulsion characteristics.

Example 3-3

A network structure was obtained in the same manner as in Example 3-1 except that the length of the heat-retaining region immediately below the nozzle was 40 mm, the discharge amount per hole was 2.2 g/min, the take-up speed was 0.9 m per minute, and the distance between the nozzle face and cooling water was 30 cm. The obtained network structure was formed of threads each having a hollow cross section as a cross-sectional shape, and having a hollowness of 31% and a fineness of 3000 dtex, and had an apparent density of 0.048 g/cm³, a thickness of flattened surface of 38 mm, a 25%-compression hardness of 189 N/φ200 mm, a 50%-compression hardness of 341 N/φ200 mm, a 70° C.-compression residual strain of 13.0%, a 50%-constant displacement repeated compression residual strain of 10.2%, a 50%-compression hardness retention of 101.1% after 50%-constant displacement repeated compression, a 25%-compression hardness retention of 77.4% after 50%-constant displacement repeated compression, and a hysteresis loss of 26.8%. The properties of the obtained network structure are shown in Table 5. The obtained cushion satisfied the requirements of the present invention, and was excellent in repeated compression durability and in high-repulsion characteristics.

Example 3-4

A network structure was obtained in the same manner as in Example 3-1 except that the thermoplastic elastic resin C-2 was used as a thermoplastic elastic resin, the length of the heat-retaining region immediately below the nozzle was 40 mm, the discharge amount per hole was 2.8 g/min, and the distance between the nozzle face and cooling water was 28 cm. The obtained network structure was formed of threads each having a hollow cross section as a cross-sectional shape, and having a hollowness of 32% and a fineness of 3100 dtex, and had an apparent density of 0.038 g/cm³, a thickness of flattened surface of 38 mm, a 25%-compression hardness of 59 N/φ200 mm, a 50%-compression hardness of 131 N/φ200 m, a 70° C.-compression residual strain of 12.6%, a 50%-constant displacement repeated compression residual strain of 8.5%, a 50%-compression hardness retention of 99.2% after 50%-constant displacement repeated compression, a 25%-compression hardness retention of 80.5%6 after 50%-constant displacement repeated compression, and a hysteresis loss of 24.7%. The properties of the obtained network structure are shown in Table 5. The obtained cushion satisfied the requirements of the present invention, and was excellent in repeated compression durability and in high-repulsion characteristics.

Example 3-5

A network structure was obtained in the same manner as in Example 3-1 except that the thermoplastic elastic resin C-2 was used as a thermoplastic elastic resin, the spinning temperature was 210° C., the discharge amount per hole was 2.5 g/min, the take-up speed was 1.2 m per minute, the distance between the nozzle face and cooling water was 32 cm, the conveyor nets were heated with an infrared heater so as to have a surface temperature of 80° C., and cooling water was heated to 80° C. The obtained network structure was formed of threads each having a hollow cross section as a cross-sectional shape, and having a hollowness of 33% and a fineness of 2800 dtex, and had an apparent density of 0.041 g/cm³, a thickness of flattened surface of 38 mm, a 25%-compression hardness of 79 N/φ200 mm, a 50%-compression hardness of 154 N/φ200 am, a 70° C.-compression residual strain of 17.7%, a 50%-constant displacement repeated compression residual strain of 10.5%, a 50%-compression hardness retention of 93.1% after 50%-constant displacement repeated compression, a 25%-compression hardness retention of 79.0% after 50%-constant displacement repeated compression, and a hysteresis loss of 23.0%. The properties of the obtained network structure are shown in Table 5. The obtained cushion satisfied the requirements of the present invention, and was excellent in repeated compression durability and in high-repulsion characteristics.

Comparative Example 3-1

A network structure was obtained in the same manner as in Example 3-1 except that the heat-retaining region immediately below the nozzle was eliminated, the discharge amount per hole was 1.9 g/min, the take-up speed was 0.9 m per minute, the distance between the nozzle face and cooling water was 30 cm, and cooling water was heated to 80° C. The obtained network structure was formed of threads each having a hollow cross section as a cross-sectional shape, and having a hollowness of 35% and a fineness of 3500 dtex, and had an apparent density of 0.042 g/cm³, a thickness of flattened surface of 39 mm, a 25%-compression hardness of 170 N/φ200 mm, a 50%-compression hardness of 308 N/φ200 mm, a 70° C.-compression residual strain of 13.8%, a 50%-constant displacement repeated compression residual strain of 11.0%, a 50%-compression hardness retention of 81.0% after 50%-constant displacement repeated compression, a 25%-compression hardness retention of 72.2% after 50%-constant displacement repeated compression, and a hysteresis loss of 39.1%. The properties of the obtained network structure are shown in Table 5. The obtained cushion did not satisfy the requirements of the present invention, and was poor in repeated compression durability and in high-repulsion characteristics.

Comparative Example 3-2

A network structure was obtained in the same manner as in Example 3-1 except that the thermoplastic elastic resin C-2 was used as a thermoplastic elastic resin, the heat-retaining region immediately below the nozzle was eliminated, the discharge amount per hole was 2.2 g/min, the take-up speed was 1.1 m per minute, the distance between the nozzle face and cooling water was 28 cm, and the conveyor nets were not heated, and were kept at a surface temperature of 40° C. The obtained network structure was formed of threads each having a hollow cross section as a cross-sectional shape, and having a hollowness of 34% and a fineness of 3800 dtex, and had an apparent density of 0.038 g/cm$^3$, a thickness of flattened surface of 38 mm, a 25%-compression hardness of 65 N/φ200 mm, a 50%-compression hardness of 137 N/φ200 mm, a 70° C.-compression residual strain of 16.6%, a 50%-constant displacement repeated compression residual strain of 9.6%, a 50%-compression hardness retention of 79.1% after 50%-constant displacement repeated compression, a 25%-compression hardness retention of 70.4% after 50%-constant displacement repeated compression, and a hysteresis loss of 37.2%. The properties of the obtained network structure are shown in Table 5. The obtained cushion did not satisfy the requirements of the present invention, and was poor in repeated compression durability and in high-repulsion characteristics.

manner as in the case of the thermoplastic elastomer D-1 using PTMG having a number average molecular weight of 2000. The thermoplastic elastomer D-1 had a PTMG content of 35% by weight and a melting point of 159° C., and the thermoplastic elastomer D-2 had a PTMG content of 55% by weight and a melting point of 140° C. The compositions of the obtained polymers are shown in Table 6.

TABLE 6

| | | Soft segment | | |
|---|---|---|---|---|
| Experiment NO. | Hard segment Component | Component | Number average molecular weight | Content | Melting point (° C.) |
| D-1 | Polyamide 12 | PTMG | 1000 | 35% | 159 |
| D-2 | Polyamide 12 | PTMG | 2000 | 55% | 140 |

The obtained thermoplastic elastomer D-1 was discharged downward from a nozzle at a spinning temperature of 220° C. and a speed of 2.4 g/min in terms of discharge amount per single hole through orifices zigzag-arranged at a pitch between holes of 5 mm on a nozzle effective face of 1050 mm in the width direction and 45 mm in width in the thickness direction, each orifice shaped to have an outer

TABLE 5

| Items | Example 3-1 | Example 3-2 | Example 3-3 | Example 3-4 | Example 3-5 | Comparative Example 3-1 | Comparative Example 3-2 |
|---|---|---|---|---|---|---|---|
| Thermoplastic elastic resin | C-1 | C-1 | C-1 | C-2 | C-2 | C-1 | C-2 |
| Spinning temperature (° C.) | 220 | 230 | 220 | 220 | 210 | 220 | 220 |
| Heat-retaining length (mm) | 30 | 40 | 40 | 40 | 30 | 0 | 0 |
| Discharge amount per hole (g/min) | 2.7 | 2.3 | 2.2 | 2.8 | 2.5 | 1.9 | 2.2 |
| Take-up speed (m/min) | 1.4 | 1.1 | 0.9 | 1.4 | 1.2 | 0.9 | 1.1 |
| Distance between nozzle face and cooling water (cm) | 26 | 28 | 30 | 28 | 32 | 30 | 28 |
| Conveyor net temperature (° C.) | 40 | 120 | 40 | 40 | 80 | 40 | 40 |
| Cooling water temperature (° C.) | 30 | 40 | 30 | 30 | 80 | 80 | 30 |
| Apparent density (g/cm$^3$) | 0.035 | 0.042 | 0.048 | 0.038 | 0.041 | 0.042 | 0.038 |
| Thickness (mm) | 38 | 38 | 38 | 38 | 38 | 39 | 38 |
| Fineness (dtex) | 3300 | 3000 | 3000 | 3100 | 2800 | 3500 | 3800 |
| 70° C.-compression residual strain (%) | 14.2 | 9.7 | 13.0 | 12.6 | 17.7 | 13.8 | 16.6 |
| 50%-Constant displacement repeated compression residual strain (%) | 12.2 | 9.6 | 10.2 | 8.5 | 10.5 | 11.0 | 9.6 |
| 25%-Compression hardness (N/φ200 mm) | 140 | 162 | 189 | 59 | 79 | 170 | 65 |
| 50%-Compression hardness (N/φ200 mm) | 271 | 305 | 341 | 131 | 154 | 308 | 137 |
| 50%-Compression hardness retention after 50%-constant displacement repeated compression (%) | 92.5 | 96.2 | 101.1 | 99.2 | 93.1 | 81.0 | 79.1 |
| 25%-Compression hardness retention after 50%-constant displacement repeated compression (%) | 80.1 | 85.0 | 77.4 | 80.5 | 79.0 | 72.2 | 70.4 |
| Hysteresis loss (%) | 31.2 | 28.4 | 26.8 | 24.7 | 23.0 | 39.1 | 37.2 |

Example 4-1

For the polyamide-based thermoplastic elastomer, a polyamide compound was obtained by a known method using ω-lauryl lactam and adipic acid, and then copolymerized by a known method using PTMG having a number average molecular weight of 1000, an antioxidant was then added in an amount of 1%, and the resulting mixture was kneaded, then pelletized, and dried under vacuum at 50° C. for 48 hours to obtain a thermoplastic elastomer D-1 having a PTMG content of 35%. As a thermoplastic elastomer D-2, a thermoplastic elastomer having a PTMG content of 55% was obtained by performing polymerization in the same diameter of 2 mm and an inner diameter of 1.6 mm and have a triple bridge hollow forming cross section. A heat-retaining region with a length of 30 mm was arranged immediately below the nozzle and cooling water of 30° C. was arranged at a position 28 cm below the nozzle face. Endless nets made of stainless steel each having a width of 150 cm were disposed parallel at an interval of 40 mm in opening width to form a pair of take-up conveyors so as to be partially exposed over a water surface. The conveyor nets over the water surface were not heated, and were kept at a surface temperature of 40° C., and the discharged threads in a molten state were curled to form loops, and contact parts were fused to form a three-dimensional network structure.

The network in a molten state was sandwiched at both surfaces by the take-up conveyors, and drawn into cooling water at 30° C. at a speed of 1.2 m per minute, thereby solidified, flattened at both surfaces, then cut into a predetermined size, and dried/heat-treated with hot air at 110° C. for 15 minutes to obtain a network structure. The obtained network structure was formed of threads each having a hollow cross section as a cross-sectional shape, and having a hollowness of 31% and a fineness of 3600 dtex, and had an apparent density of 0.038 g/cm$^3$, a thickness of flattened surface of 40 mm, a 25%-compression hardness of 233 N/φ200 mm, a 50%-compression hardness of 402 N/φ200 mm, a 50%-constant displacement repeated compression residual strain of 9.1%, a 70° C.-compression residual strain of 12.2%, a 50%-compression hardness retention of 93.4% after 50%-constant displacement repeated compression, a 25%-compression hardness retention of 82.2% after 50%-constant displacement repeated compression, and a hysteresis loss of 30.8%. Thus, the network structure was excellent in repeated compression durability and in high-repulsion characteristics. The properties of the obtained network structure are shown in Table 7. The obtained network structure satisfied the requirements of the present invention, and was excellent in repeated compression durability and in high-repulsion characteristics.

Example 4-2

A network structure was obtained in the same manner as in Example 4-1 except that the spinning temperature was 230° C., the length of the heat-retaining region immediately below the nozzle was 40 mm, the discharge amount per hole was 2.1 g/min, the take-up speed was 1.0 in per minute, the distance between the nozzle face and cooling water was 30 cm, the conveyor nets were heated with an infrared heater so as to have a surface temperature of 120° C., and cooling water was heated to 80° C. The obtained network structure was formed of threads each having a hollow cross section as a cross-sectional shape, and having a hollowness of 29% and a fineness of 3300 dtex, and had an apparent density of 0.042 g/cm$^3$, a thickness of flattened surface of 39 mm, a 25%-compression hardness of 250 N/φ200 mm, a 50%-compression hardness of 431 N/φ200 mm, a 70° C.-compression residual strain of 8.7%, a 50%-constant displacement repeated compression residual strain of 7.3%, a 50%-compression hardness retention of 98.1% after 50%-constant displacement repeated compression, a 25%-compression hardness retention of 86.3% after 50%-constant displacement repeated compression, and a hysteresis loss of 27.7%. The properties of the obtained network structure are shown in Table 7. The obtained network structure satisfied the requirements of the present invention, and was excellent in repeated compression durability and in high-repulsion characteristics.

Example 4-3

A network structure was obtained in the same manner as in Example 4-1 except that the thermoplastic elastomer D-2 was used as a thermoplastic elastomer, the discharge amount per hole was 2.5 g/min, and the distance between the nozzle face and cooling water was 30 cm. The obtained network structure was formed of threads each having a hollow cross section as a cross-sectional shape, and having a hollowness of 32% and a fineness of 3400 dtex, and had an apparent density of 0.040 g/cm$^3$, a thickness of flattened surface of 40 mm, a 25%-compression hardness of 65 N/φ200 mm, a 50%-compression hardness of 138 N/φ200 mm, a 70° C.-compression residual strain of 15.5%, a 50%-constant displacement repeated compression residual strain of 8.5%, a 50%-compression hardness retention of 87.4% after 50%-constant displacement repeated compression, a 25%-compression hardness retention of 77.1% after 50%-constant displacement repeated compression, and a hysteresis loss of 29.3%. The properties of the obtained network structure are shown in Table 7. The obtained network structure satisfied the requirements of the present invention, and was excellent in repeated compression durability and in high-repulsion characteristics.

Example 4-4

A network structure was obtained in the same manner as in Example 4-1 except that the thermoplastic elastomer D-2 was used as a thermoplastic elastomer, the spinning temperature was 230° C., the length of the heat-retaining region immediately below the nozzle was 40 mm, the discharge amount per hole was 2.8 g/min, the take-up speed was 0.9 m per minute, the distance between the nozzle face and cooling water was 32 cm, the conveyor nets were heated with an infrared heater so as to have a surface temperature of 80° C., and cooling water was heated to 80° C. The obtained network structure was formed of threads each having a hollow cross section as a cross-sectional shape, and having a hollowness of 28% and a fineness of 3200 dtex, and had an apparent density of 0.060 g/cm$^3$, a thickness of flattened surface of 39 mm, a 25%-compression hardness of 182 N/φ200 mm, a 50%-compression hardness of 344 N/φ200 mm, a 70° C.-compression residual strain of 12.0%, a 50%-constant displacement repeated compression residual strain of 5.5%, a 50%-compression hardness retention of 93.2% after 50%-constant displacement repeated compression, a 25%-compression hardness retention of 80.6% after 50%-constant displacement repeated compression, and a hysteresis loss of 22.0%. The properties of the obtained network structure are shown in Table 7. The obtained network structure satisfied the requirements of the present invention, and was excellent in repeated compression durability and in high-repulsion characteristics.

Comparative Example 4-1

A network structure was obtained in the same manner as in Example 4-1 except that the heat-retaining region immediately below the nozzle was eliminated, the discharge amount per hole was 1.9 g/min, the take-up speed was 0.8 m per minute, the distance between the nozzle face and cooling water was 29 cm, and cooling water was heated to 80° C. The obtained network structure was formed of threads each having a hollow cross section as a cross-sectional shape, and having a hollowness of 34% and a fineness of 3500 dtex, and had an apparent density of 0.048 g/cm$^3$, a thickness of flattened surface of 40 mm, a 25%-compression hardness of 311 N/φ200 mm, a 50%-compression hardness of 602 N/φ200 mm, a 70° C.-compression residual strain of 13.9%, a 50%-constant displacement repeated compression residual strain of 7.1%, a 50'%-compression hardness retention of 82.0% after 50%-constant displacement repeated compression, a 25%-compression hardness retention of 71.2% after 50%-constant displacement repeated compression, and a hysteresis loss of 37.0%. The properties of the obtained network structure are shown in Table 7. The obtained network structure did not satisfy the requirements of the present invention, and was poor in repeated compression durability and in high-repulsion characteristics.

Comparative Example 4-2

A network structure was obtained in the same manner as in Comparative Example 4-1 except that the thermoplastic elastomer D-2 was used as a thermoplastic elastomer, and cooling water was not heated, and was kept at 30° C. The obtained network structure was formed of threads each having a hollow cross section as a cross-sectional shape, and having a hollowness of 33% and a fineness of 3400 dtex, and had an apparent density of 0.048 g/cm$^3$, a thickness of flattened surface of 40 mm, a 25%9-compression hardness of 83 N/φ200 mm, a 50%-compression hardness of 192 N/4,200 mm, a 70° C.-compression residual strain of 14.0%, a 50%-constant displacement repeated compression residual strain of 6.6%, a 50%-compression hardness retention of 77.2% after 50%-constant displacement repeated compression, a 25%-compression hardness retention of 68.1% after 50%-constant displacement repeated compression, and a hysteresis loss of 38.2%. The properties of the obtained network structure are shown in Table 7. The obtained network structure did not satisfy the requirements of the present invention, and was poor in repeated compression durability and in high-repulsion characteristics.

floor mats; and mats for impact absorption such as members for prevention of collision and nipping, etc. For this reason, the network structure of the present invention significantly contributes to industries.

The invention claimed is:

1. A network structure made of a three-dimensional random loop bonded structure obtained by forming random loops with curling treatment of a continuous linear structure including at least one thermoplastic elastic resin selected from the group consisting of a polyolefin-based thermoplastic elastomer, an ethylene-vinyl acetate copolymer, a polyurethane-based thermoplastic elastomer and a polyamide-based thermoplastic elastomer, the continuous linear structure having a fineness of not less than 100 dtex and not more than 60000 dtex, and by making each loop mutually contact in a molten state, wherein
the network structure has an apparent density of 0.005 g/cm$^3$ to 0.20 g/cm$^3$, a 50%-constant displacement repeated compression residual strain of not more than 15%, and a 50%-compression hardness retention after 50%-constant displacement repeated compression of not less than 85%.

2. The network structure according to claim 1, wherein the hysteresis loss is not more than 35%.

3. The network structure according to claim 1, wherein the three-dimensional random loop bonded structure includes a

TABLE 7

| Items | Example 4-1 | Example 4-2 | Example 4-3 | Example 4-4 | Comparative Example 4-1 | Comparative Example 4-2 |
| --- | --- | --- | --- | --- | --- | --- |
| Thermoplastic elastic resin | D-1 | D-1 | D-2 | D-2 | D-1 | D-2 |
| Spinning temperature (° C.) | 220 | 230 | 220 | 230 | 220 | 220 |
| Heat-retaining length (mm) | 30 | 40 | 30 | 40 | 0 | 0 |
| Discharge amount per hole (g/min) | 2.4 | 2.1 | 2.5 | 2.8 | 1.9 | 1.9 |
| Take-up speed (m/min) | 1.2 | 1.0 | 1.2 | 0.9 | 0.8 | 0.8 |
| Distance between nozzle face and cooling water (cm) | 28 | 30 | 30 | 32 | 29 | 29 |
| Conveyor net temperature (° C.) | 40 | 120 | 40 | 80 | 40 | 40 |
| Cooling water temperature (° C.) | 30 | 80 | 30 | 80 | 80 | 30 |
| Apparent density (g/cm$^3$) | 0.038 | 0.042 | 0.040 | 0.060 | 0.048 | 0.048 |
| Thickness (mm) | 40 | 39 | 40 | 39 | 40 | 40 |
| Fineness (dtex) | 3600 | 3300 | 3400 | 3200 | 3500 | 3400 |
| 70° C.-compression residual strain (%) | 12.2 | 8.7 | 15.5 | 12.0 | 13.9 | 14.0 |
| 50%-Constant displacement repeated compression residual strain (%) | 9.1 | 7.3 | 8.5 | 5.5 | 7.1 | 6.6 |
| 25%-Compression hardness (N/φ200 mm) | 233 | 250 | 65 | 182 | 311 | 83 |
| 50%-Compression hardness (N/φ200 mm) | 402 | 431 | 138 | 344 | 602 | 192 |
| 50%-Compression hardness retention after 50%-constant displacement repeated compression (%) | 93.4 | 98.1 | 87.4 | 93.2 | 82.0 | 77.2 |
| 25%-Compression hardness retention after 50%-constant displacement repeated compression (%) | 82.2 | 86.3 | 77.1 | 80.6 | 71.2 | 68.1 |
| Hysteresis loss (%) | 30.8 | 27.7 | 29.3 | 22.0 | 37.0 | 38.2 |

INDUSTRIAL APPLICABILITY

The present invention provides a network structure in which durability after repeated compression, which has not been satisfied by conventional products, is improved without deteriorating good sitting comfort and air permeability that the conventional network structures have given. There can be provided a network structure having a small reduction in thickness and a small reduction in hardness after a long period of use, and having excellent repeated compression durability which is suitable for cushioning materials that are used for office chairs, furniture, sofas, beddings such as beds, and seats for vehicles such as those for trains, automobiles, two-wheeled vehicles, buggies and child seats;

polyolefin-based thermoplastic elastomer, and the 25%-compression hardness retention after 50%-constant displacement repeated compression is not less than 80%.

4. The network structure according to claim 1, wherein the three-dimensional random loop bonded structure includes an ethylene-vinyl acetate copolymer, and the 25%-compression hardness retention after 50%-constant displacement repeated compression is not less than 65%.

5. The network structure according to claim 1, wherein the three-dimensional random loop bonded structure includes a polyurethane-based thermoplastic elastomer or a polyamide-based thermoplastic elastomer, and the 25%-compression hardness retention after 50%-constant displacement repeated compression is not less than 75%.

6. The network structure according to claim 1, wherein the thickness of the network structure is not less than 10 mm and not more than 300 mm.

7. The network structure according to claim 1, wherein the shape of the cross section of the continuous linear structure that forms the network structure is a hollow cross section and/or a modified cross section.

* * * * *